(12) United States Patent
Willis et al.

(10) Patent No.: US 12,006,243 B2
(45) Date of Patent: Jun. 11, 2024

(54) METHODS AND SYSTEMS FOR PROCESSING GLASS AND METHODS FOR REINFORCING GLASS PRODUCTS

(71) Applicant: LCRT Pty Ltd, Rockdale (AU)

(72) Inventors: Gregory David Willis, Wollongong (AU); Graeme Lindsay White, Wagga Wagga (AU); Michael Vincent Maher, Wagga Wagga (AU)

(73) Assignee: LCRT Pty Ltd, Rockdale (AU)

( * ) Notice: Subject to any disclaimer, the term of this patent is extended or adjusted under 35 U.S.C. 154(b) by 1405 days.

(21) Appl. No.: 16/467,952

(22) PCT Filed: Dec. 8, 2017

(86) PCT No.: PCT/AU2017/051351
§ 371 (c)(1),
(2) Date: Jun. 7, 2019

(87) PCT Pub. No.: WO2018/102878
PCT Pub. Date: Jun. 14, 2018

(65) Prior Publication Data
US 2020/0071221 A1    Mar. 5, 2020

(30) Foreign Application Priority Data
Dec. 10, 2016 (AU) .............................. 2016905109

(51) Int. Cl.
*C03B 19/09* (2006.01)
*B32B 15/02* (2006.01)
(Continued)

(52) U.S. Cl.
CPC .............. *C03B 19/09* (2013.01); *B32B 15/02* (2013.01); *B32B 17/061* (2013.01); *C03C 1/002* (2013.01);
(Continued)

(58) Field of Classification Search
CPC ....... C03B 19/09; C03B 32/02; C03B 27/012; C03C 14/002; C03C 14/004;
(Continued)

(56) References Cited

U.S. PATENT DOCUMENTS 2,837,873 A * 6/1958 Lynsavage .............. C03B 19/08
                                                               264/43
4,054,435 A * 10/1977 Sakane ................... C03C 10/00
                                                               65/17.5
(Continued)

FOREIGN PATENT DOCUMENTS

CN        105293933 A      2/2016
CN        105293933 A * 2/2016
(Continued)

OTHER PUBLICATIONS

Hampton Research, Technical Data Sheet Glass 0100, May 2016, "https://hamptonresearch.com/uploads/support_materials/Glass_10_Soda_lime_glass_Glass_0100_Technical_Data_Sheet.pdf" (Year: 2016).*

(Continued)

*Primary Examiner* — Alison L Hindenlang
*Assistant Examiner* — Steven S Lee
(74) *Attorney, Agent, or Firm* — Snell & Wilmer L.L.P.

(57) ABSTRACT

A mixture including glass fragments is located in a containment vessel and is processed in a kiln to form a commercially useful building product. The mixture is initially heated over a first time period to a first temperature intermediate the glass transition point temperature and about 950° C. or 1,100° C. (Section A). At the first temperature the glass fragments slump and bond to each other and the mixture is soaked at this temperature for a second time period (Section B). After reducing the temperature (Section C), the mixture is annealed for another time period (Section D). Finally, the (Continued)

kiln is cooled to allow the mixture to be removed (Section E).

38 Claims, 7 Drawing Sheets

(51) Int. Cl.
  *B32B 17/06* (2006.01)
  *C03C 1/00* (2006.01)
  *C03C 3/078* (2006.01)
  *C03C 14/00* (2006.01)
  *E04C 2/02* (2006.01)
  *F41H 5/04* (2006.01)
(52) U.S. Cl.
  CPC ............ *C03C 3/078* (2013.01); *C03C 14/002* (2013.01); *C03C 14/004* (2013.01); *E04C 2/02* (2013.01); *F41H 5/0407* (2013.01); *F41H 5/0421* (2013.01); *C03C 2214/04* (2013.01); *C03C 2214/08* (2013.01)
(58) Field of Classification Search
  CPC . C03C 2214/04; F41H 5/0407; F41H 5/0421; B32B 17/061; B32B 15/02
  See application file for complete search history.

(56) References Cited

U.S. PATENT DOCUMENTS

| | | | | |
|---|---|---|---|---|
| 5,080,959 | A * | 1/1992 | Tanaka | E04F 13/142 428/218 |
| 5,536,345 | A * | 7/1996 | Lingart | B44F 9/04 156/89.24 |
| 5,630,857 | A * | 5/1997 | Xu | C03B 19/09 65/17.6 |
| 5,649,987 | A * | 7/1997 | Greulich | C04B 32/005 65/17.5 |
| 5,895,511 | A * | 4/1999 | Tikhonova | C03B 19/06 65/144 |
| 6,042,905 | A * | 3/2000 | Lingart | C03B 19/06 428/196 |
| 6,187,255 | B1 * | 2/2001 | Greulich | C03C 14/004 264/642 |
| 2014/0208930 | A1 * | 7/2014 | Phillips | F41H 5/0421 89/36.02 |
| 2015/0252566 | A1 * | 9/2015 | Tangeman | C03C 17/007 502/232 |

FOREIGN PATENT DOCUMENTS

| | | | | | |
|---|---|---|---|---|---|
| CN | 105599383 | A | * | 5/2016 | |
| JP | S5173514 | A | * | 6/1976 | ............ C03B 19/02 |
| JP | S5173514 | A | | 6/1976 | |
| JP | H01208346 | A | | 2/1989 | |
| JP | H01208346 | A | * | 8/1989 | ............ C03B 19/06 |
| JP | H0717732 | A | | 1/1992 | |
| JP | H04357128 | A | * | 12/1992 | ............ C03B 19/09 |
| JP | H04357128 | A | | 12/1992 | |
| JP | H0717732 | A | * | 1/1995 | ............ C03B 19/06 |
| JP | H07172865 | A | * | 7/1995 | ............ B09B 3/00 |
| JP | 2570792 | B2 | * | 1/1997 | |
| JP | H0912321 | A | * | 1/1997 | ............ C03B 19/09 |
| JP | 2000239030 | A | | 9/2000 | |
| JP | 2000239030 | A | * | 9/2000 | ............ C03B 19/08 |
| JP | 2004323279 | A | * | 11/2004 | ............ C03C 12/00 |
| JP | 2004323279 | A | | 11/2004 | |
| KR | 950006206 | B1 | * | 6/1995 | ............ B32B 5/18 |
| KR | 20030088399 | A | * | 11/2003 | |
| WO | 2005110935 | A1 | | 11/2005 | |
| WO | WO-2005110935 | A1 | * | 11/2005 | ............ C03B 19/09 |
| WO | WO-2006123206 | A1 | * | 11/2006 | ............ C03B 19/06 |
| WO | 2008046152 | A1 | | 4/2008 | |
| WO | WO-2008046152 | A1 | * | 4/2008 | ........... C03C 14/002 |
| WO | WO-2008063703 | A2 | * | 5/2008 | ............ B32B 17/06 |
| WO | WO-2008104772 | A1 | * | 9/2008 | ............ B32B 13/02 |

OTHER PUBLICATIONS

Tooley, F, Handbook of glass manufacture, 1953-1960, Ogden Pub., vol. II, p. 676 Table 14 (Year: 1953).*

Australian Examination Report No. 1 dated Oct. 14, 2021 in corresponding Australian Application No. 2017371399 filed Jul. 18, 2019; total 6 pages.

Australian Examination Report No. 2 dated Jul. 5, 2022 in corresponding Australian Application No. 2017371399 filed Jul. 18, 2019; total 9 pages.

International Search dated Feb. 19, 2018, in corresponding International Application No. PCT/AU2017/051351 filed Dec. 8, 2017; total 4 pages.

Written Opinion of the International Searching Authority dated Feb. 19, 2018, in corresponding International Application No. PCT/AU2017/051351 filed Dec. 8, 2017; total 6 pages.

Supplementary European Search Report dated Jun. 18, 2020 in corresponding European Application No. 17879248 filed Dec. 8, 2017; total 6 pages.

* cited by examiner

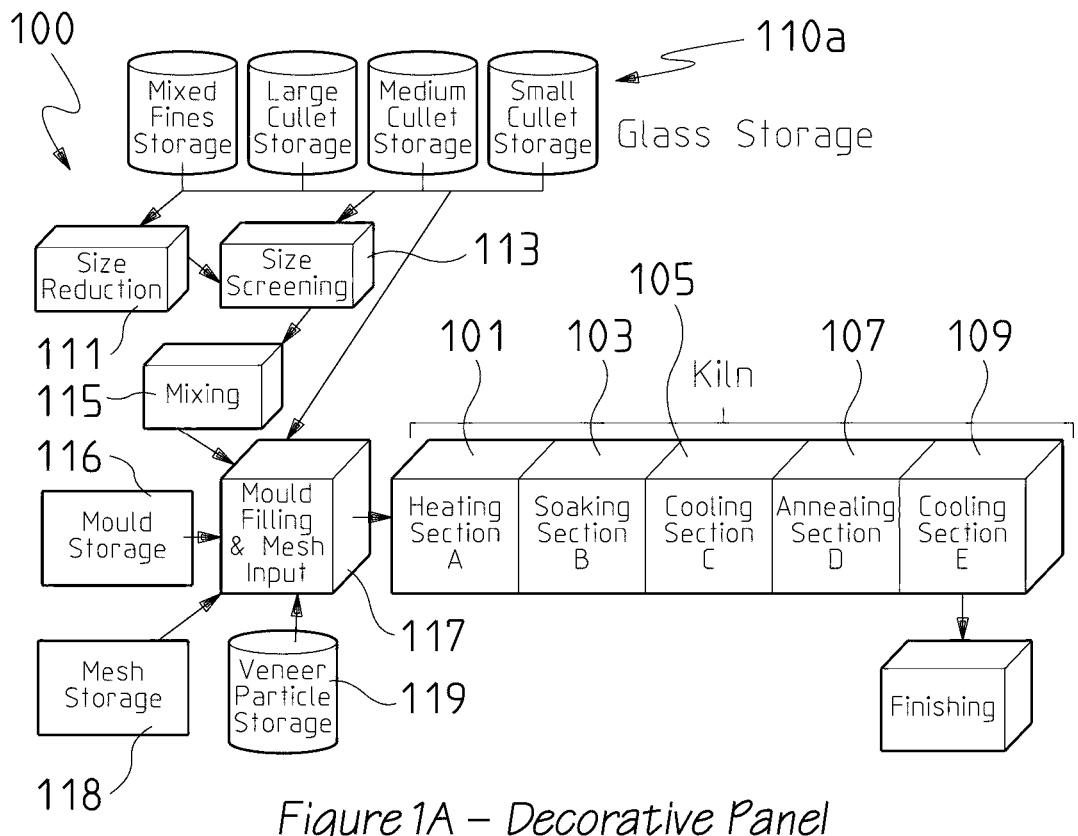
*Figure 1A – Decorative Panel*
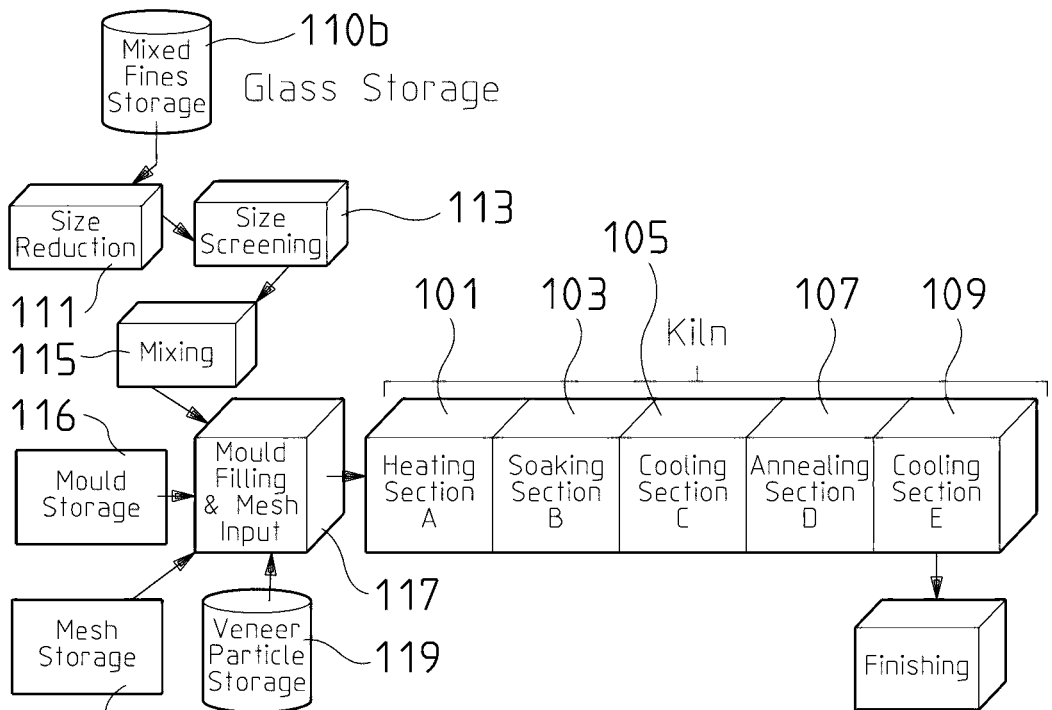
*Figure 1B – Industrial Panel*

Cullet as placed in Containment Vessel

Heat Slumped Cullet

Final product

METHODS AND SYSTEMS FOR PROCESSING GLASS AND METHODS FOR REINFORCING GLASS PRODUCTS

CROSS-REFERENCE TO RELATED PATENT APPLICATION

This patent application is a U.S. National Stage entry under 35 U.S.C. § 371 of International Application No. PCT/AU2017/051351 filed Dec. 8, 2017, which claims priority to Australian Patent Application No. 2016905109 filed on Dec. 10, 2016, which applications are hereby incorporated by reference in their entirety.

FIELD OF THE INVENTION

Embodiments of the present invention relate to the production of a product from glass and in particular to the production of an architectural product from glass.

Embodiments of the invention have been developed for use in/with the recycling, building, construction and civil engineering industries and will be described with reference to this application.

Embodiments of the invention have been developed primarily for use in methods and systems for recycling of glass products into useful architectural products and will be described hereinafter with reference to this application. However, it will be appreciated that the invention is not limited to this particular field of use.

BACKGROUND

Any discussion of the background art throughout the specification should in no way be considered as an admission that such background art is prior art nor that such background art is widely known or forms part of the common general knowledge in the field in Australia or worldwide.

Glass is used for containment of a vast amount of consumer products, for example glass jars and bottles. Manufacturing of glass from virgin materials (including sand, silica and limestone) is an extremely energy intensive process requiring the constituent materials to be heated in a furnace to about 1500° C. to melt the materials into a liquid which is then poured into moulds. Many different types of glass are available, varying in their colour, chemical composition and physical properties.

Recycling of glass into the manufacturing of new glass products typically saves approximately 75% of the energy it takes to make glass from raw materials. Every metric ton (1,000 kg) of waste glass recycled into new items saves approximately 315 kilograms (694 lb) of carbon dioxide from being released into the atmosphere during the creation of new glass. Glass that is crushed and ready to be remelted and recycled is known as cullet.

However, the return rate of glass products for recycling remains quite low. According to the Environment Protection Authority of Australia, only about 40% of glass products were recycled in Australia in 2002, rising to only about 47% in 2012. In the United States of America in 2013, 41.3% of beer and soft drink bottles were recovered for recycling, according to the U.S. EPA. Another 34.5% of wine and liquor bottles and 15% of food and other glass jars were recycled. In the United Kingdom in 2012, only 47% of container glass collected through national recycling networks was used to make new glass products. Also, in New Zealand, ACI is still based in Penrose (Auckland) and is now part of the OI (Owens, Ill/, USA) group of companies. It is the only manufacturer of glass containers in New Zealand. Otago's low landfill gate fees ($NZ40-$NZ100 per tonne) work against glass recycling because recycling competes with land-filling as a disposal option. In late 2004, ACI-OI dropped the price it paid for cullet from $NZ92 to $NZ75 per tonne. Again, in March 2005 ACI-OI dropped the price to $NZ75 per tonne for green and amber glass and $NZ10 per tonne for clear glass. The transport cost for glass waste from Otago to ACI-OI in Auckland is typically $NZ 170 per tonne, a loss/cost of $NZ 95 to $NZ 160 per tonne.

Also, since the majority of glass manufactured comprises soda-lime glass, the glass recycling process is highly susceptible to contamination from glass products such as household glass, glass ceramics such as Pyrex, oven-proof glass, light globes, window or windscreen glass, medical glass or opaque glass. The contaminants (including non-soda-lime glasses and non-glass contaminants) have different thermal properties and hence melt at different temperatures to recyclable glass. Accordingly, management of contaminants, including mixtures of different glass types, in recycled glass stockpiles is an important consideration in the further processing of the recycled glass feedstocks since small amounts of contaminants in the glass can render large quantities of recycled glass unsuitable for recycling in current glass manufacturing operations.

Over 60 million tonnes of waste glass is generated worldwide each year. In waste glass mixtures from a Materials Recovery Facility (MRF), of the chemical/physical types of cullet, the most common type of glass in the waste stream is Soda-Lime Glass, typically comprising more than 90% by mass. Contaminants in the recycled glass waste stream typically comprise non-glass (metals, stone etc.) or glass of a different chemical/physical type (for example Borosilicate glass—Pyrex etc.). Cullet from the waste stream comes in no particular size. Typically waste glass separated by a MRF has cullet size distribution with 65% above 8 to 10 mm, 25% above 5 mm, and 10% less than 5 mm in size. Cullet of less than or equal to 3 mm in size is referred to as fines. Glass cullet may be of general form, not specific to one type, and not specific of one colour. Alternatively, the glass cullet may be separated in accordance with various aspects of the glass forming the cullet, for example by average particle size, or by colour. This can be also completed by hand sorting and collection processes.

Worldwide waste glass has little commercial value and is normally sent to landfill, or stockpiled in waste-glass 'mountains'. Inevitably, the resource and its stored energy (from initial production of the glass products) is lost, and also from its disposal. There is significant energy used before the cullet arrives at the likely landfill end of life cycle. Such wasted energy typically comprises energy used to: get the raw materials to the factory; melt the materials to make the glass; finish off the glass by annealing; cast the glass to a product form (for example, a wine bottle); take the glass product to market; fill the bottle; label the bottle; transport the bottle to the retailer; storage of the product; refrigerate the bottle; product (e.g. bottle) is taken by the customer; the collection of the empties; transport to the MRF; the sorting in the MRF; the treatment of the cullet in the MRF; the transportation of the waste cullet to the landfill; and excavate and fill the hole at the landfill.

The glass recycling industry is largely operated by glass manufacturers and recycles only a proportion of this waste stream glass.

Transportation of glass over any significant distance for recycling is cost ineffective because glass is heavy and not particularly valuable.

To be able to recycle glass in furnaces, the waste glass also needs to be colour-sorted, a costly process.

Furnace-ready cullet must also be free of contaminants such as metals, ceramics, gravel, stones, and other types of glass, such as ovenware, Pyrex and crystal.

Glass manufacturers are limited in the amount of mixed colour-cullet (called "3-mix") they can use to manufacture new containers.

The following table lists common viscosity fix-points, applicable to large-scale glass production:

| $log_{10}(\eta,$ Pa·s) | $log_{10}(\eta,$ P) | Description |
|---|---|---|
| 1 | 2 | Melting Point (glass melt homogenization and fining), $T_m$ |
| 3 | 4 | Working Point (pressing, blowing, gob forming) |
| 4 | 5 | Flow Point |
| 6.6 | 7.6 | Littleton Softening Point (Glass deforms visibly under its own weight. Standard procedures ASTM C338, ISO 7884-3) |
| 8-10 | 9-11 | Dilatometric Softening Point, $T_d$, depending on load |
| 10.5 | 11.5 | Deformation Point (Glass deforms under its own weight on the μm-scale within a few hours.) |
| 11-12.3 | 12-13.3 | Glass Transition Temperature, $T_g$ |
| 12 | 13 | Annealing Point (Stress is relieved within several minutes.) |
| 13.5 | 14.5 | Strain Point (Stress is relieved within several hours.) |

The table indicates that for different glass chemistries and temperature properties, there can be a similar outcome achieved in the processes disclosed herein for all glass types, just requiring different temperature conditions.

Soda-Lime Glass:

The bulk of the glass waste stream comprises soda-lime glass. For example, in Europe at least 92% of all glass manufactured is soda-lime glass. Other glass forms, which demand higher temperatures for recycling than those required by soda-lime glass, or which have differing characteristics to soda-lime glass, are treated as contaminants in the recycling process. FIG. 9 shows a graph of the energy consumption of different prior art ceramic products with the respective different firing temperatures required.

The methods and processes disclosed herein, however, only require a maximum firing temperature, $T_{max}$, of either about 960° C. or 1,100° C., depending upon the type of product to be fabricated signifying a significant decrease in the total energy required for fabrication of the products disclosed herein. The energy saving of the methods and processes disclosed herein is contrasted with traditional glass recycling where the cullet is melted at 1,400° C. to 1,600° C. Other ceramic-based products have processes with significant drying requirements and maximum operating temperatures ranging from 1,000° C. to 1,400° C., wherein all the material needs to be completely treated. Embodiments of this invention are heat-treated preferably to 875° C., which represents approximately a 100% energy saving compared ceramics fired at 1,100° C., and approximately a 600% energy saving compared to those fired at 1400° C.

The product produced with some embodiments of this technology has many properties resembling those of stone and can replace stone products in many end uses.

Stone products are generally produced with an environmental cost and in many countries there are strict policy product requirements, regarding environmental damage. Stone is a non-replaceable resource whereas this product is contingent on the generally ever increasing supply of wasted glass.

Typically, any waste generated in this process, such as from trimming or polishing operations, can be recycled. Typically, any product made by this process can be recycled through the process, providing for ongoing resource sustainability. Typically, any product made by this process, and that has seen out its use, can be recycled in this process, providing for sustainability.

It is to be understood that, if any prior art information is referred to herein, such reference does not constitute an admission that the information forms part of the common general knowledge in the art, in Australia or any other country.

Accordingly, there is a long-felt need for improved methods for recycling glass products, such methods being more tolerant to contaminants in the cullet used for glass recycling.

SUMMARY OF THE INVENTION

Embodiments of this invention relate to the manufacture of architectural panels from waste glass, with steel mesh reinforcement. The steel mesh reinforcement has little effect on strength, but an enormous effect on toughness ($G_c$ fracture energy, a measure of impact strength, measured in $J/m^2$). For this reason, it is important to define what is meant by the two different properties of strength, and toughness (impact strength in $J/m^2$).

Strength, measured in MPA, is essentially a measure of how much static load, per unit area, is required for fracture. Strength of metals are easy to define as they are ductile, flaw tolerant, and they fracture predictably. Measured strength of glass and ceramics is very unpredictable and highly dependent on the method used to test it, the complex microloading environment, and on the flaw population, and much less dependent on inherent material properties. It is almost totally unaffected by reinforcement. The strengths of ordinary glass, steel-mesh reinforced glass and ceramics, and ordinary steel are all very similar. All typically in the order of a few hundred MPa.

When it comes to Toughness (impact strength in $J/m^2$), ordinary glass, steel-mesh reinforced glass and ceramics, and ordinary steel differ enormously. Toughness (impact strength in $J/m^2$) is most accurately defined as fracture energy (energy or work required to fracture the material) and is measured in $Jim^2$. Steel-mesh reinforced glass is 10 to 1,000 times tougher than ordinary glass, depending on the type and amount of mesh. Ordinary steel is approximately 100,000 times tougher than ordinary glass depending on the grade of steel. While toughness may seem an esoteric parameter, it actually bears a closer relevance to service life than strength and is easy to quantify. How high do you have to drop a plate onto concrete for it to shatter? A glass plate, perhaps 10 centimetres. A steel-mesh reinforced ceramic maybe 10 to 100 metres. Steel plate, no height is enough as terminal velocity in air precludes breakage but in a vacuum at 1 G, a height of tens of kilometres. Height is a measure of gravitational potential energy, and thus relates directly to work of fracture (toughness). A more industry relevant example is "how many hammer blows does it take to break a plate?" For an ordinary glass plate, one soft hammer blow will shatter it. For a steel-mesh reinforced glass, hundreds of soft hammer blows will do nothing, but dozens of full strength hammer blows will ultimately pulverise it. For an ordinary steel plate, a very large number of soft hammer blows will likely do nothing, nor even hundreds of full strength hammer blows. A human wielding a hammer typically cannot fracture a steel plate.

A source of potential confusion is that the parameter $K_{Ic}$ is sometimes used as the definition of toughness. $K_{Ic}$, measured in $MPa \cdot m^{1/2}$, is actually a measure of the critical stress intensity at a crack tip for unstable crack propagation. $K_{Ic}$ is a more esoteric parameter that does not correlate linearly with the amount of work required to fracture a material. The approximate relationship between $K_{Ic}$ and impact strength is that Impact Strength ($J/m^2$) is proportional to the square of $K_{Ic}$ ($MPa \cdot m^{1/2}$).

There are many industry standards for strength of ceramics. This is because it is such an unpredictable property and so entirely dependent on the method used to test it. There are many industry standards for strength of metals and toughness of metals. There are some industry standards for defining $K_{Ic}$ for ceramics, but finding standards for measuring Impact Strength (toughness as $J/m^2$) for steel mesh reinforced ceramics is problematic, since steel mesh reinforced ceramics are new, the basis of some embodiments in this patent, and a disruptive technology for the traditional ceramics industry. In engineering terms, toughness (impact strength in $J/m^2$) equates to the area under the stress-strain curve, while strength equates to the maximum point in the stress strain curve, fundamentally very different properties.

Essentially, some embodiments of this invention have a toughness (impact strength in $J/m^2$) comparable to reinforced concrete and to fibreglass, which lies midway in the toughness continuum between glass and steel. In other words, in comparison to ordinary glass and ceramics, embodiments of this invention can typically be expected to withstand tens to hundreds more impact events (hammer blows, being dropped, rough handling, earthquake, etc.) without breakage.

According to a first aspect of the invention, there is provided a method for processing a mixture in a kiln, said mixture comprising glass fragments, the process comprising the steps of: locating the mixture in a containment vessel or containment system and locating at least one layer of reinforcement adapted to mechanically interlock with said mixture when heated; and heating said mixture at a temperature between the glass transition point temperature and about 950° C. such that the glass fragments slump and bond to form a commercially useful building product.

According to a particular arrangement of the first aspect, there is provided a method for processing a mixture, the mixture comprising glass fragments, the process comprising the steps of: locating the mixture in a containment vessel or containment system; heating the mixture at a temperature between the glass transition point temperature and about 950° C. such that the glass fragments slump and bond to form a commercially useful building product.

According to a second aspect of the invention, there is provided a method for processing a mixture in a kiln, the mixture comprising glass fragments, the method comprising the steps of: locating said mixture in a containment vessel or containment system and locating at least one layer of reinforcement adapted to mechanically interlock with said mixture when heated; and heating the mixture at a temperature between the glass transition point temperature and 1,100° C. such that the glass fragments slump and bonds to form a commercially useful building product.

According to a particular arrangement of the second aspect, there is provided a method for processing a mixture in a kiln, the mixture comprising glass fragments, the method comprising the steps of: locating the mixture in a containment vessel or containment system; loading the containment vessel into the kiln; heating the mixture at a temperature between the glass transition point temperature and 1,100° C. such that the glass fragments slump and bonds to form a commercially useful building product.

According to a particular arrangement of either the first or the second aspects, the step of heating the mixture may comprise the step of initially heating the mixture over a first time period, ti, as quickly as possible to a first temperature, $T_1$ temperature $T_1$ being intermediate the glass transition point temperature and a maximum temperature $T_{max}$, where $T_1$ is between about 800° C.-950° C. for stone-like products and between about 950° C. to about 1,100° C. for glass-like products. The step of heating may further comprise the step of soaking the mixture at the first temperature for a second time period, $t_2$ ranging from between time-periods of about 10 minutes to several hours, depending on the product thickness and mass of glass and in some cases mesh to be soaked. There is no upper limit to soak time, it is essentially a cost factor in processing. The step of heating may further comprise the step of cooling the mixture over a third time period, $t_3$, as quickly as the kiln/process equipment permits to a second temperature, $T_2$, of between about 500° C. to about 750° C., preferably 500° C. to 650° C. and in a preferred embodiment it is 520° C. to 560° C. The step of heating may further comprise the step of annealing the mixture at the second temperature, $T_2$, over a fourth time period, $t_4$, between about 30 minutes to several hours depending on the product thickness and mass of glass and in some cases mesh. There is no upper limit on the annealing time, it is also essentially a cost factor in processing. The step of heating may further comprise the step of finally cooling the mixture over a fifth time period, $t_5$, as quickly as the kiln/process equipment permits to form the product.

The first, third and fifth time periods may be as short as the kiln permits. The second time period may be between 10 minutes to several hours. The fourth time period may be between 30 minutes to several hours.

The method may be adapted for manufacture of a stone-like product and the first temperature may be between about 800° C. to about 950° C. The method may be adapted for manufacture of a glass-like product and the first temperature may be between about 950° C. to about 1,100° C. The method may be adapted for manufacture of an industrial product and wherein the mixture may comprise glass fragments of size less than about 3 mm. The method may be adapted for manufacture of a decorative product and the mixture may comprises glass fragments of size greater than about 3 mm. The step of locating the mixture in the containment vessel comprises the step of locating at least one layer of reinforcement, adapted to mechanically interlock with the mixture when heated.

According to a particular arrangement of the first aspect, the maximum temperature, $T_{max}$, for the 'stone-like' products may be about 950° C. For the 'glass-like' product described herein, $T_{max}$, is approximately 1,100° C. . . . . The product may be a decorative panel having aesthetic properties, or an industrial product that is relatively dull and opaque in appearance. The product may have fracture properties along particle boundaries. The second, soaking time period, $t_2$, may be less than or up to about 20 minutes.

According to a particular arrangement of the second aspect, maximum temperature, $T_{max}$, may be about 1,100° C. The product may be a decorative or an industrial product comprising either clear (either transparent or opaque) or coloured glass, which is more homogenous. The product may break as a normal soda lime glass product.

The mixture may comprise one or more of (i) virgin glass, (ii) glass from the waste stream and (iii) contaminants.

The method may further comprise the step of locating additives in the containment vessel/system prior to, or during, the heating of the mixture.

The method for processing a mixture may be adapted for forming a panel, the panel comprising a panel thickness. The mixture may comprise waste glass fragments of a size between about 0.5 mm and the panel thickness. The mixture may comprise waste glass fragments of a size between about 0.01 mm and the panel thickness. The mixture may comprise waste glass fragments of a size between about 0.05 mm and the panel thickness. The mixture may comprise waste glass fragments of a size between about 0.1 mm and the panel thickness. The mixture may comprise waste glass fragments of a size between about 0.15 mm and the panel thickness. The mixture may comprise waste glass fragments of a size between about 0.2 mm and the panel thickness. The mixture may comprise waste glass fragments of a size between about 0.25 mm and the panel thickness. The mixture may comprise waste glass fragments of a size between about 0.3 mm and the panel thickness. The mixture may comprise waste glass fragments of a size between about 0.35 mm and the panel thickness. The mixture may comprise waste glass fragments of a size between about 0.4 mm and the panel thickness. The mixture may comprise waste glass fragments of a size between about 0.45 mm and the panel thickness. The mixture may comprise waste glass fragments of a size between about 0.5 mm and the panel thickness. The mixture may comprise waste glass fragments of a size between about 1 mm and the panel thickness. The mixture may comprise waste glass fragments of a size between about 2 mm and the panel thickness. The mixture may comprise waste glass fragments of a size between about 3 mm and the panel thickness. The mixture may comprise waste glass fragments of a size between about 4 mm and the panel thickness. The mixture may comprise waste glass fragments of a size between about 5 mm and the panel thickness.

The commercially useful building product may comprise one or more of an architectural panel, a tile or similar industrial product.

According to a third aspect of the invention, there is provided a process for forming a glass product, the process comprising: providing a containment system; locating a mixture in the containment system, the mixture comprising glass fragments and locating at least one layer of reinforcement adapted to mechanically interlock with said mixture when heated; applying at least one heating process and at least one cooling process to the mixture, wherein the at least one heating process comprises a first heating process of heating the one or more materials to a soaking temperature being a temperature between the glass transition point temperature and 950° C. such that the glass fragments slump to form the product.

According to a particular arrangement of the third aspect, there is provided a process for forming a glass product, the process comprising: providing a containment system; locating a mixture in the containment system, the mixture comprising glass fragments; applying at least one heating process and at least one cooling process to the mixture, wherein the at least one heating process comprises a first heating process of heating the one or more materials to a soaking temperature being a temperature between the glass transition point temperature and 950° C. such that the glass fragments slump to form the product.

According to a fourth aspect of the invention, there is provided a process for forming a glass product, the process comprising: providing a containment system; locating a mixture in the containment system, said mixture comprising glass fragments and locating at least one layer of reinforcement adapted to mechanically interlock with said mixture when heated; applying at least one heating process and at least one cooling process to the mixture, wherein the at least one heating process comprises a first heating process of heating the mixture to a soaking temperature being a temperature between the glass transition point temperature and 1,100° C. such that the glass fragments slump to form the product.

According to a particular arrangement of the fourth aspect, there is provided a process for forming a glass product, the process comprising: providing a containment system; locating a mixture in the containment system, the mixture comprising glass fragments; applying at least one heating process and at least one cooling process to the mixture, wherein the at least one heating process comprises a first heating process of heating the mixture to a soaking temperature being a temperature between the glass transition point temperature and 1,100° C. such that the glass fragments slump to form the product.

The mixture may further comprise contaminants. Any volatiles that may be contained within the contaminants may be released during the process and the remainder of the contaminants form portions of the product.

The mixture may comprise additives for enhancing an aesthetic or functional feature of the product. The enhanced functional feature may comprise one or more of slip resistance, texture, and other enhancements used in tiles and architectural panels. The enhanced aesthetic feature may comprise one or more of colour, texture, and other enhancements used in tiles and architectural panels.

The product may be panel-like. The step of locating the mixture in the container may comprise locating at least one layer of the mixture in the containment system.

The process may further comprise the step of lining the containment system with a release liner prior to the step of locating the mixture in the container.

The contaminants may comprise less than or equal to about 25% of the mass of the mixture.

The additives may be selected to change a physical property, an aesthetic property or a chemical property of the product. The aesthetic property may be colour of the product.

The aesthetic property may comprise the shape of the product. The shape of the product may be selected from one or more of: cubes; rectangles; irregular shapes and lumps; interlocking tiles; or any other two dimensional or three dimensional shape.

The aesthetic property may comprise non-flat products such as dishes, flowerpots and the like and other non-flat products. The aesthetic property may comprise an internal texture of the product. The aesthetic property may comprise a surface texture enhancement of the product. The surface texture enhancement may be selected from one or more of non-slip or abrasive texturing.

The additive may comprise one or more of abrasive grit, corundum, carborundum, garnet or the like.

The aesthetic property may comprise the translucency of the product. The product may be adapted for use in a lighting application. The product may be adapted as a light diffuser. The product may be adapted for use in conjunction with a light source embedded within the panel. The embedded light source may be an LED or LCD lighting source.

The property may be a range of mounting/attachment options. The property may comprise one or more of moulded handles or the drilling of holes and gluing.

The property may be a range of chemical resistivity properties. The property may comprise chemical resistivity to acid product and mild bases. Alternatively, or additionally, the property may comprise chemical resistivity to organic solvents and oils and grease products. The property may be a range of electrical conductivity and dielectric properties. The property may be a textured surface of embossed patterns, corporate logos, text, etc.

The at least first heating process may be carried out in a kiln.

The mixture may comprise at least two cullet types. The at least two cullet types may comprise cullet types of different size categories. The at least two cullet types may comprise cullet of different colours.

The at least one layer of the mixture in the containment system may comprise two or more layers of cullet.

In a particular arrangement, the product may be panel-like, or other shaped. The mixture may comprise at least two cullet types being a first cullet type and a second cullet type. The step of locating the mixture in the containment system may comprise locating at least a first layer of cullet of the first cullet type and a second layer of cullet of the second cullet type.

The step of locating the mixture in the containment vessel comprises the step of locating at least one layer of reinforcement. The at least one layer of reinforcement is adapted to mechanically interlock with the at least one layer of cullet in the containment vessel. The at least one layer of reinforcement may comprise a welded mesh. The mechanical interlock with the at least one layer of cullet may be effected by welded node points of the mesh. The at least one layer of reinforcement may comprise a woven mesh. The mechanical interlock with the at least one layer of cullet may be effected by kinked node points of the woven mesh.

The at least one layer of cullet may comprise at least two layers of cullet. A layer of the at least one layer of reinforcement may be located intermediate the two layers of cullet.

The at least one layer of reinforcement may comprise a metal reinforcement member. The metal reinforcement member may comprise a mesh. The mesh may comprise a two dimensional mesh, or a three dimensional mesh, or a mesh of any other shape adapted to enhance the strength of the product. The mesh may comprise a welded rectangular wire mesh comprising wires. The wires may have a spacing of between about 5 mm and 100 mm. The wires may have a wire thickness of between about 0.1 mm and 6 mm.

The mesh may comprise a welded square wire mesh comprising wires. The wires may have a spacing of about 25 mm spacing. The wires may have a wire thickness of between about 2 to 3 mm.

The mesh may be formed from steel wire. The mesh may comprise either galvanised or zinc-coated metal. The mesh may comprise either a welded or woven metal mesh. The mesh may be formed from mild steel. The mesh may be formed from stainless steel. The mesh may be formed from a material having a thermal coefficient of expansion that is greater than that of the product.

The process may further comprise the step of tamping the mixture in the containment vessel prior to the first heating process. The process may further comprise the step of maintaining the soaking temperature for a first selected period of time. The process may further comprise the step of cooling the mixture to an annealing temperature. The process may further comprise the step of maintaining the annealing temperature for a second selected period of time to form the product.

The process may further comprise the step of compressing the mixture in the containment vessel at the soaking temperature.

The process may further comprise the step of, after the step of maintaining the annealing temperature for the second selected period of time, cooling the product to allow removal of the product from the containment vessel or container system.

The mixture may comprise soda-lime glass. The glass transition point temperature may comprises about 500° C. or greater. The working glass viscosity point temperature may be about 1,100° C. The soaking temperature may be between about 800 and 950° C. The soaking temperature may be about 875° C.+/−25° C. The soaking temperature may be about 875+/−75° C. The annealing temperature may be between about 500° C. to about 750° C., preferably 500° C. to 650° C. and in a preferred embodiment it is 520° C. to 560° C.

According to a fifth aspect of the invention there is provided a product formed by the process of any one of the preceding aspects.

According to a sixth aspect of the invention, there is provided a containment vessel, or a containment system adapted to receive the mixture for formation of the product according to any one of the preceding aspects. The container or containment system may be formed of stainless steel or some other suitable material. Alternately, the container or containment system may be of a material adapted to disintegrate at a point in the process when the product strength is sufficient to maintain stability for the remainder of the process. Alternately, a container or containment system may be for initial forming of the mixture in accordance with the product and adapted to be removed prior to heating and firing of the mixture.

Other aspects of the invention are also disclosed.

BRIEF DESCRIPTION OF THE DRAWINGS

Notwithstanding any other forms which may fall within the scope of the present invention, a preferred embodiment/preferred embodiments of the invention will now be described, by way of example only, with reference to the accompanying drawings in which:

FIG. 1A shows system overview diagram for a method of forming a decorative panel in accordance with a particular arrangement of the present invention; and FIG. 1B shows a system overview diagram for a method of forming an industrial panel in accordance with another particular arrangement of the present invention.

DETAILED DESCRIPTION

Figure 2A:
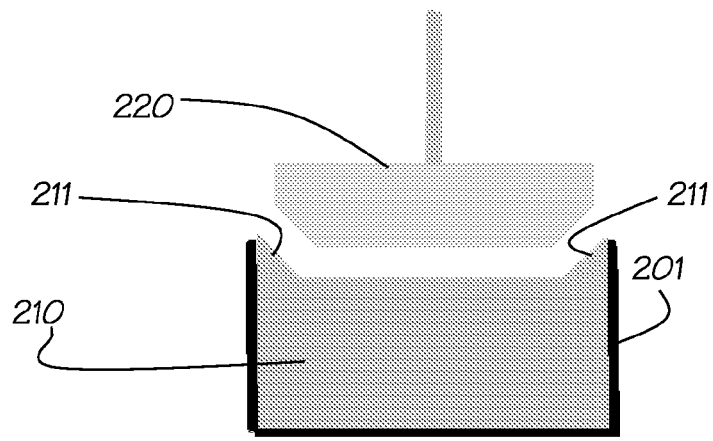
FIGS. 2A, 2B, and 2C are diagrams respectively depicting the placement of glass cullet in a containment vessel/system, the allowance for edge effects and the slumped final product in the containment vessel.

The products described herein are made from a mixture comprising pieces of glass (broken or otherwise) commonly referred to as cullet. Cullet can be formed from either intentionally broken pieces of virgin glass, or from glass recovered from the waste stream. All types of glass can be used in the processes disclosed herein, however, modification of the temperatures required for processing the glass mixture is necessary as would be appreciated by the skilled addressee.

Embodiments of the present invention seek to provide alternative solutions for recycling cullet and to create products formed from cullet, particularly cullet recovered from the waste stream. Embodiments of the present invention relate to the use of glass and primarily waste soda-lime glass in particular in the creation of a building product such as an architectural panel or tile from such glass.

The glass processing methods and processes disclosed herein utilise at least some of the energy that has already been spent to make the glass and which would otherwise be lost if the waste glass was sent to expensive and non-productive uses, such as land fill.

The products disclosed herein thus formed from the glass cullet may be made from different sizes of recycled cullet resulting in strong and attractive products of different physical and aesthetic appearance.

The products disclosed herein thus formed from the glass cullet may also be reinforced internally to improve the physical strength of the product. This reinforced product is specifically a composite made from recycled glass and reinforced with embedded metal-wire, ideally in the form of a welded or woven mesh. This is similar to the reinforced concrete (Rebar) concept.

Embodiments of the processes disclosed herein and the resulting products combine several unique attributes:

- It is environmentally sound as it removes waste glass from the waste stream and re-utilises energies already spent in the manufacture of the waste glass.
- It has a low cost of manufacture.
- It has a very pleasant appearance.
- It has a very high impact strength permitting large panels to be made which are durable to transport and use in building projects
- It is able to be drilled enabling secure attachment Strength of Product Glass by its nature is brittle and subject to fracture from impact and/or shipment damage. Similarly, ceramic and stone building products suffer from brittleness and impact damage, both in transport and use. Embodiments of the processes disclosed herein look to ameliorate the current problems of brittleness and impact damage, both in product transportation and use.

The use of embedded wire mesh allows for large panels to be manufactured, transported, installed and safely used. Embodiments of the products formed by the processes disclosed herein replace products that are brittle, damage easily and have a high negative environmental impact by comparison. Large panels which have been formed by the processes disclosed herein, even if cracked, may remain functional allowing for safe replacement (until such time as the crack exposes the internally disposed strengthening mesh to water such that corrosion of the metal mesh can occur, however, this is not a concern where stainless steel mesh is used as the reinforcement).

Fracture energy (Gc), sometimes referred to as impact strength, is a very meaningful measurement of one of the benefits of this group of products formed by embodiments of the processes disclosed herein. It is a measure of the tolerance of the product to damage. The fracture energy is equal to the integral under the stress-strain curve and describes the ease or difficulty with which it is to break the panel from, for example, a bird strike, a hammer blow, an earthquake, a speed-bump hit by the truck transporting the product, the impact of a builder accidentally dropping the panel on the ground or bumping it into a hard obstacle during construction.

Adding a metal mesh, internally disposed within the product has an enormous effect on fracture energy (impact strength) of the product, typically increasing it by one or two orders of magnitude (a similar result to the case with steel reinforcement in reinforced concrete). By contrast, the cost of the metal mesh is minimal in the cost of the product.

Energy Saving:

Embodiments of the product manufacturing processes disclosed herein utilise the embedded energy of the waste glass, add a little more, and produce a quality and valuable product. The intention of forming glass panels or tiles by the manufacturing processes disclosed herein from glass product recovered from the waste stream (recycled glass) is to reduce the energy consumption of recycling and allows the recycling to be conducted at the point of waste, thus negating the need for costly transporting of an inherently low value product and minimising the amount of recycled glass that is ultimately sent to landfill.

Removal of Waste from the Waste Stream:

Embodiments of the manufacturing processes disclosed herein seek to provide a solution to the waste glass problem, instead creating sustainable and localised waste recycling options with low energy footprints and creating building products that have desirable brittleness and impact damage properties, whilst providing other favourable physical and aesthetic qualities as well as environmental and social benefits.

Glass Panel:

According to an embodiment of the present invention, a process is provided to take glass and contaminated glass and convert it to architectural products with the end products having high strength and impact resistance, along with favourable aesthetic qualities and/or other favourable physical properties, such as resistance to acids, mild bases, oil/grease contamination and to graffiti. Embodiments of the processes disclosed herein are able to be employed as either a batch, semi-continuous or continuous processes as would be appreciated by the skilled addressee. However a continuous process allows economies of scale advantages in production of the architectural products.

According to a further embodiment of the present invention, a process is provided to take glass and contaminated glass and convert it to panel-like products with an embedded metal reinforcing that results in an end product having extremely high impact resistance, along with the other aesthetic and physical properties. The process is also envisaged as a batch, semi continuous or a continuous process. However a continuous process allows economies of production.

Embodiments of the process aspects disclosed herein are able to accept substantially all common forms of glass and many forms of contaminated glass, of strongly differing physical/chemical nature, as feedstock, whether in different colours and particle sizes, such as fines less than 1 mm or large cullet having an average particle size of 25 mm or more. Indeed the maximum particle size of the glass fragments in the process feedstock is only limited by the desired thickness of the end product. In the case where the process calls for at least two or more layers of feedstock glass mixtures or cullet, say when used in conjunction with a reinforcing layer, the maximum particle size of the glass fragments in the process feedstock used for each layer is only limited by the thickness of the layers of the product.

Embodiments of the processes disclosed herein allow for panels to be 100% glass, or contaminated to significant levels such as the levels of contamination typically found in cullet or fines from a Materials Recovery Facility (MRF). Additional contaminants may be added to the mixture in the containment vessel specifically for a desired purpose such as, for example, to include surface additions for such things as non-slip surfaces.

Additionally, coatings can be applied to the panel before and/or after heat treatment, to allow the resulting products to be used in different applications. Such coatings may be to provide, for example, a decorative surface, a non-slip surface or a surface required for a particular end use application (as may be required for legal reasons—such as road surfaces and walkways). Examples of surface coatings may be for example hard grit, such as silicon carbide for a non-slip surface; or fine oxide powders, such as for example iron red or manganese black, for aesthetic patterning of the end product.

Embodiments of the products formed using processes disclosed herein have properties of glass and resemble stone in many characteristics, such as mode of breakage and the product can be finished with similar tools to finish stone products in addition to other favourable characteristics such as being hard, durable, brittle, strong in compression, and corrosion resistant. Additionally, embodiments of the products formed using processes disclosed herein have a tough strong texture resulting from the interleaving of vitrified glass cullet.

Like all laminated—or ply—material, the strength of the blend is determined by overlaying and slumped unmelted pieces of cullet, as well as the strength of the aesthetically pleasing discolouration zone which grows from the surface of the cullet particle towards the centre.

Embodiments of the glass panel products formed using processes disclosed herein can be produced with virtually zero porosity. Porosity is a measure of the internal voids in a material. Typically there are two types of porosity; namely open porosity and closed porosity. Open porosity is where there are interconnected pores linked to the surface, whereas closed porosity is where there are internal unconnected pores. Embodiments of the glass panel products formed using processes disclosed herein substantially do not absorb oils or greases therefore, they are easily cleaned and are suitable for use in locations that require a high level of hygiene, such as bench tops in kitchens, medical, research and teaching applications.

Embodiments of the glass panel products formed using processes disclosed herein have a wide range of favourable chemical resistivity qualities. The property may comprise chemical resistivity to acid product and mild bases. Alternatively, or additionally, the property may comprise chemical resistivity to organic solvents and oils and grease products. Embodiments of the glass panel products of this invention are also strongly resistant to graffiti attack. Embodiments of the glass panel products formed using processes disclosed herein can be shaped, for example, they can be made into cubes, rectangles, blobs, spheres and interlocking tiles for a wide variety of applications, not just large panels and tiles. Embodiments of the glass panel products of this invention can also be non-flat products such as dishes and flowerpots. Embodiments of the glass panel products formed using processes disclosed herein can be made to different internal textures. Embodiments of the glass panel products formed using processes disclosed herein can be made to different surface textures, for example, as a non-slip surface.

Embodiments of the glass panel products formed using processes disclosed herein can be made to different levels of translucence. These can be used as diffusers for lighting or under lit for illuminated flooring. The product may be nearly transparent, or it may be opaque depending on the cullet size, soak temperature and treatment and the colour and cleanliness of the cullet. In a particular example arrangement, the translucent glass panel product may be adapted for use in the lighting industry for a light diffuser, or to be used in the lighting industry light through embedded luminance such as from LED lamps.

Embodiments of the glass panel products formed using processes disclosed herein are able to be finished using readily available glass and stone working tools.

Embodiments of the glass panel products formed using processes disclosed herein can be made with attachments, such as handles, which can be slump moulded into the product.

Embodiments of the glass panel products formed using processes disclosed herein can have holes drilled for the attachment of the panel and to allow the joining and mounting to other materials.

Embodiments of the glass panel products formed using processes disclosed herein have high electrical resistivity and electrical dielectric properties but can be modified to have different electrical properties.

Homogenous cullet of non-soda-lime glass types can also be treated with this technology, albeit working under a different temperature regime.

Environmental Benefits:

The recycling of glass in glass furnaces and the manufacture of ceramics have relatively high energy footprints.

Embodiments of the processes disclosed herein are based on a low energy usage process, particularly when compared with the energy requirements of manufacturing virgin glass products.

Embodiments of the glass recycling technology disclosed herein are based on processing of mixtures including glass particles, such as cullet, which typically is low in moisture content from the MRF or needs little energy to dry. The cullet is used dry and without binders. There is no need to create a paste with binders that would need extensive drying such as required in typical existing processes for processing cullet mixtures. As such, waste and low grade heat from the processes disclosed herein would typically be sufficient to dry the cullet feedstock, if needed.

Embodiments of the technology seek to use as much as possible cullet feedstock in its collected size, without the necessity to reduce cullet size, although this may be necessary to ensure the correct proportion of product cullet size mix.

An embodiment of the product is made from recycled waste soda-lime glass, and is manufactured at temperatures much lower than conventional ceramic tiles or glass panels, where the main energy cost of manufacture of ceramics and glass is the manufacturing temperature, with energy consumption rising exponentially with the temperature of operation. The preferred maximum operating temperature of this process is about 850° C. and it is not necessary to have complete treatment of the product, although this may be warranted for many end product applications.

Collected glass waste may be stored as collected, and/or may be sorted into colours purely for end product aesthetic and product end property purposes.

Cullet can be washed and dried, such as for an aesthetic decorative panel quality, however unwashed cullet can also be used. The drying process can be done either before being placed in the mould, or in the mould as a pre-heat at 100° C.

The glass can be size segregated or further broken and screened in a controlled manner into an assortment of sizes. A range of sizes and colours can create a range of visual products, and a range of physical attributes, for the finished product. For example, cullet can be used in the condition it exits the MRF, or it can be further broken down into cullet with smaller average particle size.

The cullet is typically sorted and stored in five size categories.

Cullet (glass) pieces larger than about 25 mm (sorted through a 25 mm screen);
Cullet (glass) pieces larger than about 12 mm and smaller than about 25 mm;
Cullet (glass) pieces larger than about 8 mm and smaller than about 12 mm;
Cullet (glass) pieces larger than about 3 mm and less than about 12 mm; and
'Fines'—Cullet (glass) that are less than or equal to about 3 mm.

In the processes disclosed herein, cullet from the different size categories can be used for manufacture of different architectural or building products. For example, glass cullet sizes from about 3 mm to about 25 mm and clean glass fines may be used for the production of aesthetically Decorative Panels, whilst glass cullet which is less than or equal to about 3 mm in size, together with contaminated glass fines, may be used as the principal cullet feedstock material for an Industrial building product such as, for example, tiles.

Cullet can be premixed into different particle sizes and/or glass colour or layered into a containment vessel/system, or onto a conveyor system.

Mixed and contaminated particle glass feedstock materials when made into a panel using the processes disclosed herein can have a dull grey or brown, opaque appearance. In contrast, panels made from large particles of a pre-selected colour glass can have a colourful wavy/creamy and translucent appearance, when made to the preferred manner.

Wine bottles and beer bottles are typically made from different coloured glass. Panels made from their waste reflect the colour of the cullet, or they can be blended from a mixture of different coloured cullet mixtures.

Other non-glass particles or shapes, referred to as additives and/or contaminates, may also be added. Alternatively, the mixtures used may comprise a quantity of glass of a different type (for example borosilicate glass, Pyrex or heat resistant glass in a feedstock mixture of predominantly soda-lime glass cullet) and the different glass type(s) in the mixture may be considered to be contaminants in the cullet feedstock. The processes disclosed herein as tolerant of such contaminants in the feedstock mixture when forming the typical industrial products as disclosed herein or similar.

Alternatively, glass colourant additives may be added to the feedstock mixture to achieve a desired visual appearance or effect in the finished product. Standard glass colourants are available and other coloured non-glass material, such as oxides, ochres and clays may be added for a desired colour effect.

A combination of layers of different size glass, colourants and non-glass particles and shapes may be used in the same panel, or mixed in a structured way or homogeneously depending on the desired aesthetics and/or the desired end product properties required for a particular product.

Further still, a thin layer of veneering particles may be laid down as the first layer of particles in the container or containment system of the processes disclosed herein. After treatment, the veneering particles are in effect bonded to the glass product to provide desirable surface properties of the final product. The surface properties may be a physical property such as, for example, a non-slip surface, or the desired surface properties may be decorative in nature.

Reinforced Products

In further arrangements of the processes disclosed herein, there may be added a metal mesh between layers of glass compound which, after heat treatment, forms an internally disposed strengthening layer which adds significantly to the fracture or impact resistance of the finished product. The metal mesh may, for example, be stainless steel, ordinary steel, or another metal product, and may, for example, be a woven two dimensional metal mesh, a welded two dimensional metal mesh, a woven or welded three-dimensional metal mesh or the like. After the manufacturing process for the reinforced product, the product comprises an internally disposed strengthening layer formed by the metal reinforcing.

The products formed by the methods disclosed herein which include a metal reinforcing mesh—relate generally to composite materials, and specifically composites made from recycled glass and reinforced with embedded metal-wire, ideally in the form of a welded or woven mesh, in a similar manner to the well-known and established reinforced concrete concept.

High impact resistance (toughness) is achieved in products formed by the processes disclosed herein which include an internally disposed metal reinforcing layer. In comparison with conventional glass panels and ceramic tiles, the reinforced glass products formed using the manufacturing methods and processes disclosed herein has an impact resistance which may be up to tens to hundreds of times higher or more than unreinforced glass products. The typical impact resistance of the reinforced glass products disclosed herein has been found to be comparable to that of reinforced concrete. Accordingly, the panels formed by the processes disclosed herein are much less susceptible to breakage from, for example a bird strike, a hammer blow, an earthquake, a speed-bump hit by the truck transporting the panels, the impact of a builder accidentally dropping the panel on the ground or bumping it into a hard obstacle during construction, etc.

Traditional ceramics materials are capable of significant structural load bearing in compression, but exhibit poor strength characteristics under impact loading or vibration. In the past, reinforced ceramics have been developed which are aimed at improving these structural characteristics. Fibre reinforcement has been found to be the most effective technique for toughening ceramics since it induces a number of toughening mechanisms including crack bridging, frictional de-bonding, fibre pull-out, and crack deflection. These fibres are typically comprised of ceramic filaments or whiskers.

Some embodiments of the methods and processes disclosed herein are particularly adapted to providing a reinforced glass panel made from recycled glass which has both advanced structural characteristics, particularly in relation to toughness and impact resistance and which may be produced at lower cost as compared to traditional ceramic building products due to the dual benefits of using a waste product as the raw material, and the much lower manufacturing temperature than is normally used for the manufacture of ceramic and glass building products.

Accordingly, embodiments of the products formed by the methods and processes disclosed herein provide a composite material comprising a glass body. The glass body advantageously incorporates glass and contaminant particles which are bonded in a glass matrix and which are reinforced by continuous metal fibres configured to provide tensile constraint within the final manufactured material. This tensile constraint is principally bi-axial, but may also have a longitudinal (z-pinning) component as would be appreciated by the skilled addressee.

The applicant has advantageously found that an embodiment of a composite material formed using the methods and processes disclosed herein exhibits excellent characteristics in compression, tension, bending, toughness and impact resistance. The embodiment of the glass product without the mesh has been shown to be substantively stronger than concrete and stone on a strength/mass ratio, and to be many times stronger than minimum commercial/regulatory requirements—particularly in terms of the toughness and impact resistance of the finished product. The embodiment of the mesh reinforced glass product is typically up to one or two orders of magnitude greater impact strength.

The metal reinforcement used in some embodiments of this invention is ideally in the form of continuous metal fibres or wires formed into a mesh-like structure (discontinuous fibres such as chopped short fibres or whiskers may also be used in the products, however, the toughness of a material formed using such loose individual fibres or wires is often very much lower than products formed with a continuous reinforcement structure). These continuous metal fibres may take the form of long rods or wires, woven wire mesh, or welded wire mesh. The wires preferably span almost the entire width of the glass body in at least two axes (x-axis, y-axis) to provide the biaxial constraint.

It is preferable that the wires do not extend quite to the edges due to the significant advantage of having the wires or mesh reinforcing layer sealed internal to the finished product to prevent the metal reinforcing layer from corrosive elements that would otherwise be exposed to if the reinforcing layer is in contact with the external environment with respect to the finished glass product. In alternate arrangements, the metal reinforcing layer may extend beyond the extent of the final building product, however, metal wires that extrude from the finished glass product should be treated as would be appreciated by the skilled addressee, so that the metal wires do not rust or corrode, and so that the finished products are safe for handling.

One advantage in the use of continuous fibres, in comparison with whiskers or chopped short fibres, is that the ratio of the peripheral oxidation zone to the un-oxidised core is very much smaller for a thick wire than for a microscopic whisker or chopped fibre. A peripheral oxidation zone is an inevitable consequence of high temperature processing of a metal, and this oxidation zone is unable to perform the ductile structural role of the parent metal. Oxidised metal is non-metallic in its properties. Therefore oxidation is undesirable. The thickness of the oxidation zone is fixed for a given temperature/atmosphere/time combination, therefore the thicker the wire, the smaller the percentage of wire cross-section that is ruined by oxidation.

Preferably the metal reinforcement includes nodes or ridges spaced along its outer surface to act as anchor-points to anchor the metal reinforcement into the glass body. The anchor-points provide mechanical interlocking in the glass body, thereby constraining the fibres from sliding or pulling through the glass body when loaded. A welded mesh is ideal in this regard.

In a particular arrangement of the finished products as disclosed herein, the metal wire composition used for providing a reinforcement layer to the product, may be chosen such that the thermal expansion co-efficient of the metal is higher than that of the glass body. In this case, as the glass composite product is formed by heat treatment, on cooling of the material, the metal reinforcement thermally contracts more than the glass body does, thereby placing the metal wires in tension and the glass body of the product in compression. This provides increased toughness benefits similar to those typically seen in post-stressed reinforced concrete, however, the glass products formed by the processes disclosed herein are much simpler and lower in cost to achieve as it simply arises when steel and most alternative structural metals (generally having a high expansion coefficient) reinforce glass (generally having a low expansion coefficient).

In a particular arrangement of the reinforced glass product, the metal reinforcement may constitute a relatively large part of the composite material, and may comprise one layer or more than one layer (e.g. two, three, four, five or more layers) of metal reinforcing. The actual amount of the reinforcement may vary depending on the desired end-use application of the composite glass product. Accordingly, the metal content of the finished product may be in the range of between about 1 to about 15% in volume of the composite glass material. Alternatively, the metal content of the finished product may be in the range of between about 1 to about 20%. Alternatively, the metal content of the finished product may be in the range of between about 1 to about 30%.

In a particular arrangement, the metal reinforcement is a common metal such as mild or stainless steel. An advantage of using common metals such as mild or stainless steel is that they can be incorporated in the high quantities without making the finished product prohibitively expensive. Also, the use of a relatively large volume of continuous metal reinforcement which is anchored within the glass body of the final product provides biaxial constraint, and enables very high levels of tensile constraint to be achieved in the composite final material.

As the tensile constraint protects the glass material from tensile failure, the preferred forms of the processes disclosed herein provide for finished glass products exhibiting enhanced performance characteristics particularly in respect of its toughness and impact resistance. The level of tensile constraint in the finished products will vary depending on the mis-match of the coefficient of thermal expansion in the glass body to that of the metal reinforcement. Glass bodies are ideally suited to be reinforced by metal as the coefficient of thermal expansion of the glass can easily be established to suitably mis-match that of common metals such as mild or stainless steel. Similarly, for a particular glass type, the type of mesh can be chosen to maximise the mis-match in coefficient of thermal expansion.

The optimum level of tensile constraint will vary depending on the desired application of the finished composite glass material. The thermal expansion coefficient of the glass component of the finished product formed by the processes disclosed herein is typically in the range of about 5 to about 10 micron/mK (microns per metre per Kelvin). This range of thermal expansion coefficient values is ideally suited to be used with a mild-steel reinforcing layer which has a thermal expansion coefficient of about 11.7 micron/m K.

Preferably, the metal reinforcement is in the form of either a two-dimensional or three-dimensional welded or woven wire mesh. A mesh is ideal for providing the required biaxial tensile constraint and furthermore, the morphology of the mesh provides numerous anchor points (e.g. each welded junction in a welded mesh acts as an anchor point). Alternatively, woven mesh has a series of sharp bends in the wires as they pass over and under one another in the weave. Such bends in the woven wires also provides an anchoring point for the glass body, albeit inferior to that of the weld nodes of a welded mesh.

In a particular arrangement, the metal reinforcement is arranged in a plurality of layers in the composite body. In this arrangement, each layer or combination of layers provides bi-axial tensile constraint, thereby enabling the tensile reinforcement to be distributed throughout the glass body. In a further arrangement, the multiple layers of reinforcement within the glass body are interconnected by lateral (z-axis) reinforcement such as wire stirrups. Placing a number of layers of continuous fibres/wires/mesh/etc. on top of one another, and weaving the layers together with metal stirrups gives a 3-dimensional lattice of wires, thereby giving continuous fibre reinforcement in all three axes within the finished glass body. This 3-dimensional arrangement also provides the significant advantage of preventing de-lamination of the contiguous layers of the glass product during fracture. Furthermore, there is an inherent manufacturing advantage in using pre-wired stacks of metal fibres as they can readily be incorporated in the glass body during processing.

Embodiments of the glass panels formed by the processes disclosed herein can be produced with zero porosity. Water absorption by the finished product can only occur through open porosity. Therefore, a material with no open porosity is not susceptible to corrosive moisture-induced attack (e.g. rust or corrosion) on its metal reinforcement. A material with closed porosity but no open porosity therefore has substantially zero water absorption. Typically a glass with porosity below 5% generally only has closed pores. The advantage of a low or zero porosity in the finished product such as a glass panel is that it can assist in preventing corrosion of the metal reinforcement with only minimal cover (with stainless steel mesh this is not such an issue, however, moisture absorption is also a hygiene and aesthetic issue, unsightly and unsanitary slimes can populate porous ceramic).

In alternative arrangements, the composite material formed by the processes disclosed herein may be reinforced by a metal other than mild steel or stainless steel. Preferably the metal reinforcing used will be of a low cost material, such as, for example, stainless steel, mild steel, zinc coated or galvanised mild steel or copper. However, higher cost metals such as superalloy, nickel, chromium, tungsten, titanium, molybdenum, tantalum and niobium may be used if desired. However, it is to be appreciated that many of these higher cost metals, whilst providing adequate performance, are likely to make the cost of the finished product prohibitive for widespread use. Boutique usage of processes disclosed herein, however, may consider metal reinforcement with materials other than mild steel or stainless steel.

In particular arrangements, e.g. where the metal reinforcing material is mild steel, the metal may be protected from corrosion typically by a zinc coating or may be galvanised, to prevent oxidation during processing. For maximum corrosion resistance in service, the metal reinforcement is ideally stainless steel.

The amount of metal reinforcement in the composite material will depend on the required structural characteristics. Preferably, however, the resultant metal content is between about 1% and about 15% volume of the total volume of the composite material, ideally about 5% to about 10% for a building panel.

In the embodiment where a wire mesh is used, preferably the wire thickness is larger than about 0.01 mm and ideally between about 1 mm and about 6 mm. The wire thickness may be about 0.01 mm to about 6, mm, 0.05 mm to about 6 mm, 0.1 mm to about 6 mm, 0.2 mm to about 6 mm, 0.3 mm to about 6 mm, 0.4 mm to about 6 mm, 0.5 mm to about 6 mm, 0.6 mm to about 6 mm, 0.7 mm to about 6 mm, 0.8 mm to about 6 mm, 0.9 mm to about 6 mm, 1 mm to about 6 mm, about 2 mm to about 6 mm, about 3 mm to about 6 mm, about 4 mm to about 6 mm, about 5 mm to about 6 mm, about 1 mm to about 6 mm, or about 2 mm to about 5 mm, about 3 mm to about 5 mm, about 4 mm to about 5 mm, or about 1 mm to about 4 mm, about 2 mm to about 4 mm, about 3 mm to about 4 mm, or about 1 mm to about 3 mm, or about 2 mm to about 3 mm. The wire thickness may be about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 2.0, 2.5, 3.0, 3.5, 4.0, 4.5, 5.0, 5.5, or about 6.0 mm. The thinner the wire, the more flexible the mesh, however, such flexibility can be problematic during processing of the material. Also, the thinner the wire, the broader the oxidation zone in relation to the total cross-section of the finished product after processing. Thinner wire, therefore, is typically inferior—it is floppy and thus harder to keep flat during processing, and a larger proportion of its cross-section is oxidation zone, meaning it is less ineffective as a reinforcement in the finished product.

Preferably the grid size of the mesh is as small as possible, commensurate with allowing free flow of the cullet glass mixture feedstock particles. In a particular arrangement, the grid size is within the range of about 5 to about 50 mm, ideally about 25 mm. Alternatively, the grid size may be in the range of about 5 to about 50, about 10 to about 50, about 15 to about 50, about 20 to about 50, about 25 to about 50, about 30 to about 50, about 40 to about 50, or about 5 to about 40, about 10 to about 40, about 15 to about 40, about 20 to about 40, about 25 to about 40, about 30 to about 40, about 5 to about 30, about 10 to about 30, about 15 to about 30, about 20 to about 30, about 25 to about 30, about 5 to about 25, or about 10 to about 25, about 15 to about 25, about 20 to about 25, and may be about 5, 10, 15, 20, 25, 30, 35, 40, 45, or about 50 mm. Preferably the metal mesh enables stability, especially for thinner product forms.

Product Manufacture Processes

The processes disclosed herein are adapted for manufacture of architectural or building products and typical examples of the products produces by the disclosed methods include architectural panels which may, for example, be of at least two types including a Decorative Panel of high aesthetic quality or and heavy panels or building tiles or pavers that are described hereunder as an Industrial Panel.

Both the Decorative Panel and the Industrial Panel may optionally be reinforced with one or more layers of metal mesh. In the processes disclosed herein the feedstock for manufacture of the decorative or industrial panels is preferably a mixture comprising glass pieces or fragments such as, for example, glass cullet recovered from the waste stream. The glass cullet used in the examples presented herein comprise substantially of soda-lime glass as this type of glass forms the bulk of the type of glass found in the waste stream.

The cullet, with or without a reinforcing mesh, is preferably heat processed in a kiln. Depending on the kiln construction, the layered glass and metal mesh panel is heated in a containment vessel, or a containment system formed from stainless steel or some other suitable material. Alternately, the containment system may be of a material designed to disintegrate at a point in the process when the product strength is sufficient to maintain stability for the remainder of the process. Alternately, a containment system may be for initial forming of the shape of the panel to be manufactured and removed prior to heating and firing of the feedstock mixture.

Alternatively, the feedstock mixture may be processed in a semi-continuous or continuous process—depending on the technology and capabilities of the kiln used in the process. Hereafter, moulds, containment vessel and containment systems, and other technologies, are referred to containment vessels, or alternatively just vessels.

The containment vessel is generally of a larger size than the final size of the panel to be formed to allow trimming and shaping of the finished panel to the desired size. The containment vessel typically may have a flat bottom or may be shaped for a physical or decorative effect in the resulting finished panel.

Under this condition, the density (amount) of cullet must be graded across the containment vessel to compensate for slumping of the cullet during the soaking phase When the mesh is to be placed into the construction of the product, it is typically desirable for the placement is as flat as possible.

Figure 2B:
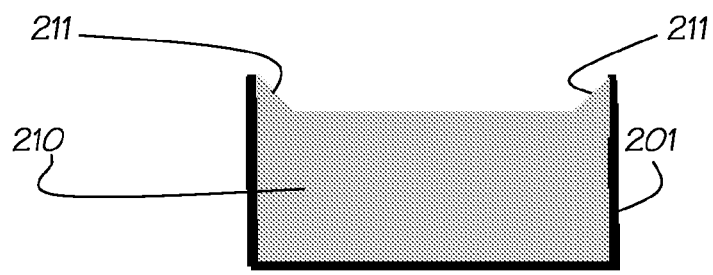
Figure 2C:
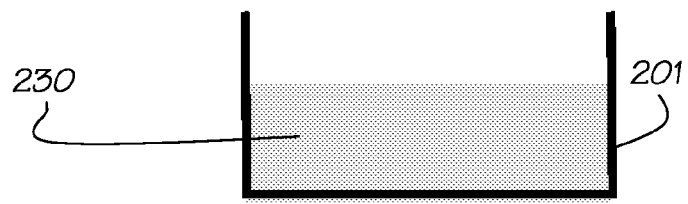

In the case of flat-bottomed containment vessels, the final layers of glass (and mesh if added) are tamped to create an edge effect (refer FIGS. 2A and 2B). On slumping of the panel during heat treatment this edge effect flattens to reduce the extent of finishing required (FIG. 2C).

In the case of a containment vessel bottom with decorative effect a corresponding tamping plate effect can be made on the top of the cullet before heat treatment to reduce the extent of finishing required.

Containment vessels can be of non-rectangular shape. This could be to allow interlocking panels.

Containment vessels can be designed with patterns—such as company logo or non-slip patterns—to be imprinted in the surface of the finished product.

A ridge, or ridges, in the edge of the containment vessel may be required to allow the mounting and retention of the embedded mesh. Again, modifications of the distribution of the cullet may be required to allow for slumping.

A containment vessel/system release agent is applied to the containment vessel to allow the release of the product.

The Cullet Firing Curve

Figure 4:
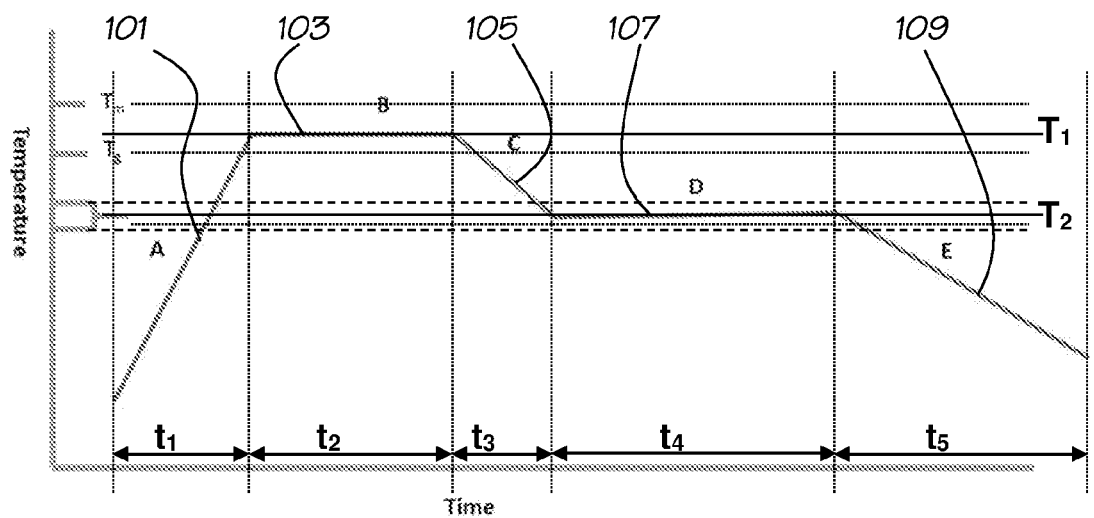
FIG. 4 shows furnace time and temperature graph for an embodiment of the process.
Figure 5:
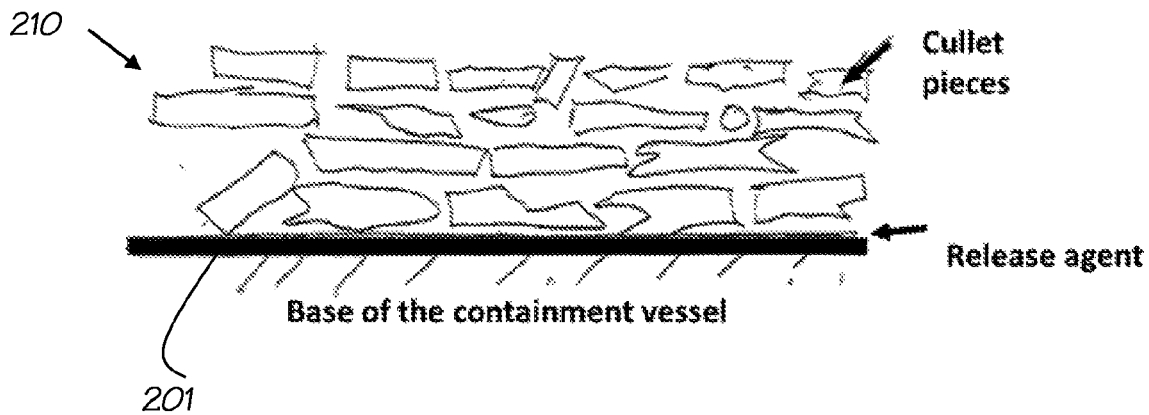
FIG. 5 shows an example placement of a mixture formed of a glass cullet for loading in a containment vessel to form a manufactured product according to the methods and systems disclosed herein.
Figure 6A:
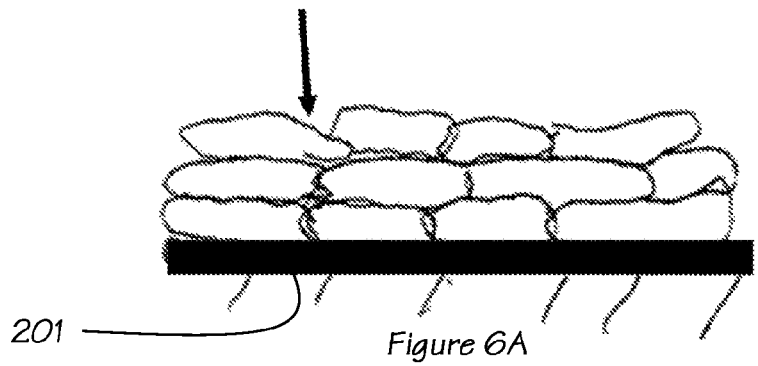
FIG. 6A shows a representation of the cullet during the heating stage of the process disclosed herein wherein the cullet mixture has slumped in the containment vessel.
Figure 6B:
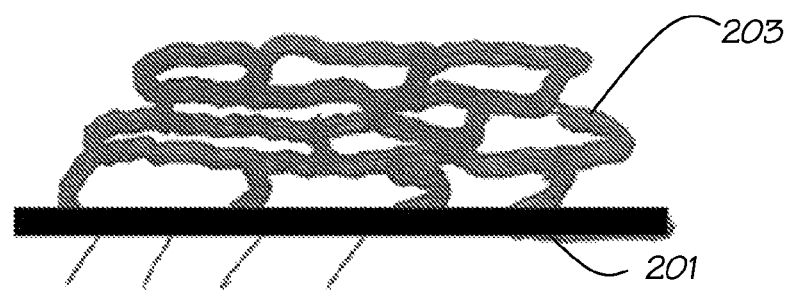
FIG. 6B shows a representation of the finished manufactured product within the containment vessel and comprising slumped glass pieces bonded together by regions of aesthetically pleasing white zones.
Figure 7:
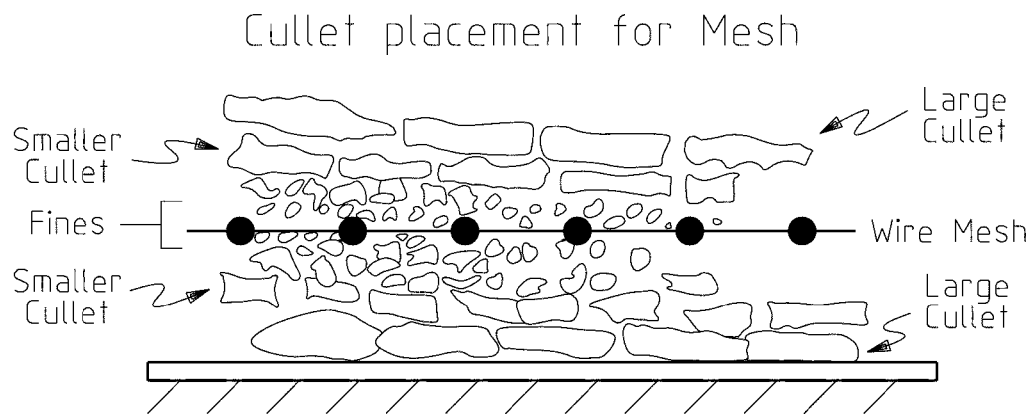
FIG. 7 shows a cross sectional representation of a particular example arrangement of a loaded containment vessel comprising a mixture of variously sized glass cullet and metal mesh layer within the mixture used to form a reinforced product.
Figure 8:
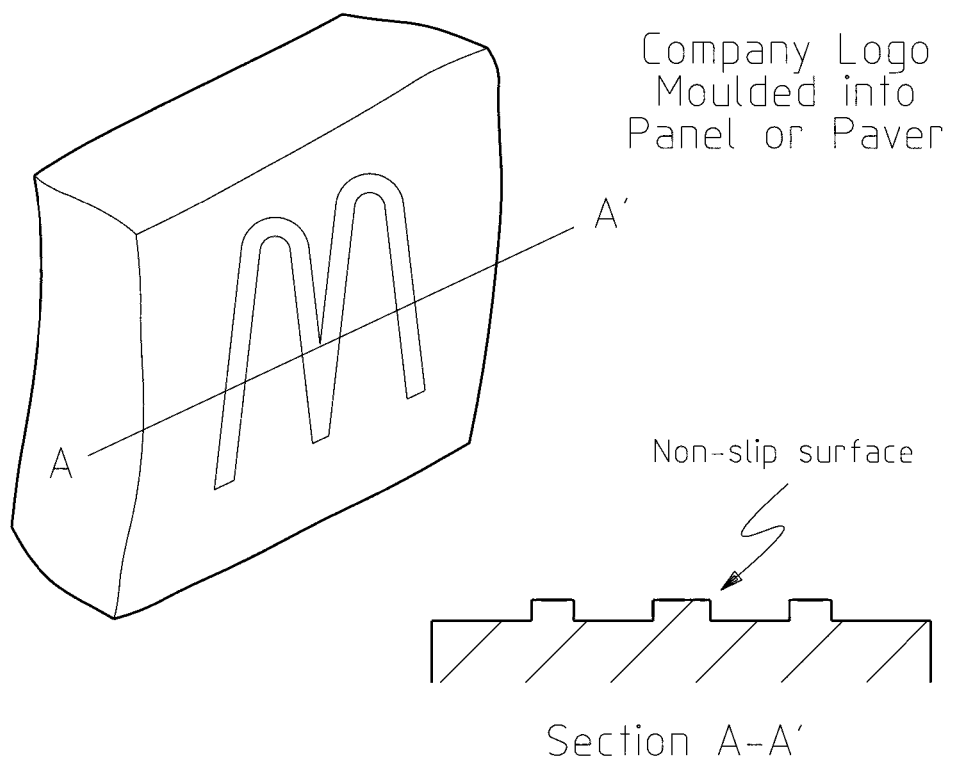
FIG. 8 shows an example product comprising a company logo moulded into the product formed by the processes as disclosed herein, shown in both perspective and cross section view.
Figure 9:
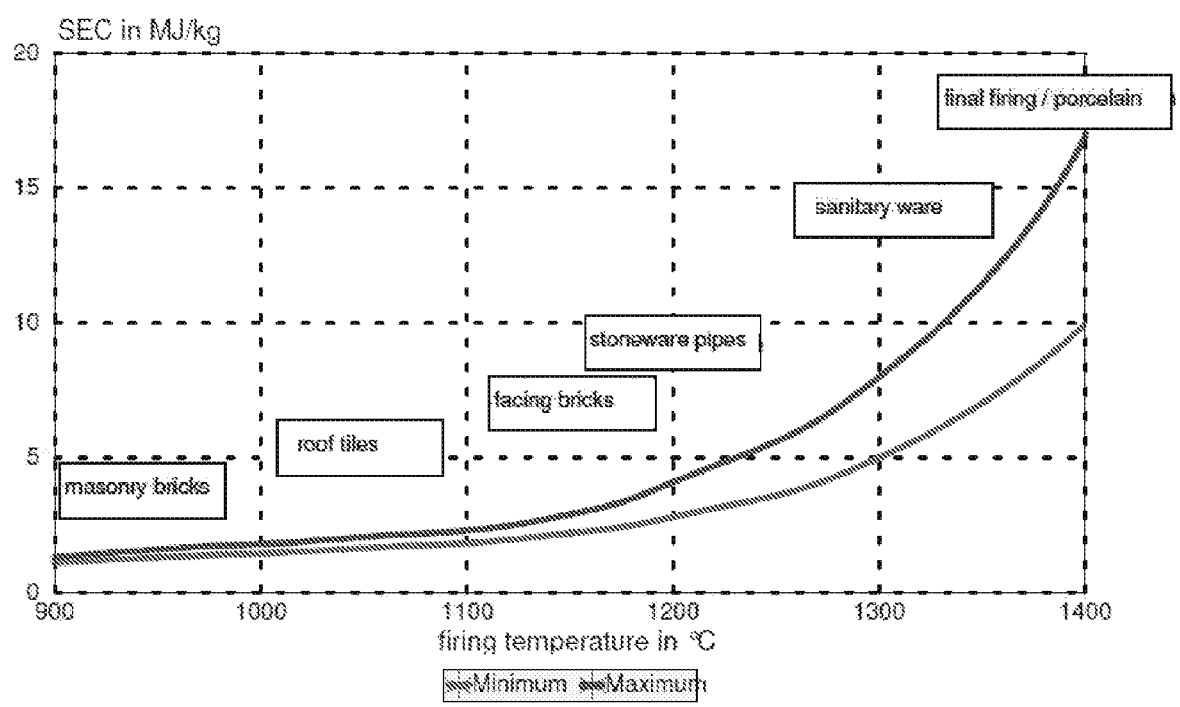
FIG. 9 shows a graph of energy consumption of different prior art ceramic products with its different firing temperatures.

The Cullet Firing Curve is described here, and shown schematically in FIG. 4. The firing curve may be linear and/or curved between points operational points, and this may be related to the characteristic of the kiln itself.

Section A is the heating of the glass cullet. The temperature ramps to the desired temperature as defined in Section B. This is undertaken as quickly and as efficiently as can be done within the capacity of the kiln. It is in this zone that slumping of the glass cullet begins to occur under its own weight and the weight of any cullet above it, filling voids and compacting the cullet together. The slumping temperature (or Strain Point) for soda-lime glass begins close to 500° C.

Section B is the soaking part of the firing curve. Here the temperature is held constant in the range 800° C. to 950° C. for 20 minutes or longer, depending on the product thickness and amount of metal mesh included. Higher temperatures can be used, from 950° C. to close to the melt temperature, $T_m$, however this changes the aesthetic and physical properties of the product. Therefore, the selection of temperature and soaking time determine the aesthetic and other physical properties of the product At the preferred soak temperature of between 800 and 950° C., such an aesthetic outcome may be a visually pleasing discolouration zone 203 (usually white in appearance) around the periphery of the original cullet feedstock particles. This discolouration zone is a physical phenomenon that is highly dependent on the heat-treatment temperature during processing. The resultant unreinforced panel tends to behave like stone on fracturing. The finished product comprising the discolouration zone 203 is in effect a polycrystalline structure with the white zone representing a microstructural discontinuity that impedes crack propagation and thereby enhances impact strength.

After a soak temperature beyond 950° C. the discolouration disappears and the resulting product tends to fracture as would a virgin glass window or containment product. In this higher soak temperature regime, the final product becomes glassy in nature which has little or no microstructural discontinuity to impede crack propagation and thus lower impact strength, which is not terribly important if the finished product comprises a reinforcing mesh.

The processing of cullet at relatively low soak temperatures of 800 to 950° C. for relatively short duration provides for relatively low energy usage.

Exact value of soaking temperature and soaking time depends on the kiln characteristic and performance parameters and also the initial composition and end properties of the product, such as product thickness and the cullet size used. The thermal conductivity of the cullet also controls the time required for soaking. Further compaction of cullet occurs under gravity, locking particles together. Alternately, a pressure can be applied to the shape at the soak temperature, reducing the time of processing. The final product is, in simple terms, solid glass particles bonded together. Changes in temperature and soaking times modify the amount of bonding and hence the physical properties of the product and its appearance.

In some embodiments of the process, temperature control and uniform temperature throughout the material is imperative to (i) ensure that the cullet remains in the desired soak range, and (ii) to allow full densification of the glass product (virtually eliminating porosity) and (iii) for the aesthetically pleasing discolouration zone to grow to a level sufficient for the desired aesthetics.

It is in this section (Section B) that the process results in a fully dense fused glass decorative panel with an aesthetically pleasing discolouration zone (usually white in appearance) around the periphery of the original cullet feedstock particles. This discolouration zone is a physical phenomenon that is highly dependent on the heat-treatment temperature during processing. The low thermal conductivity of cullet—high thermal resistivity—controls the diffusion in of the heat and hence the growth rate of the aesthetically pleasing discolouration zone which grows from the surface of the cullet particle towards the centre. It is probable that this aesthetically pleasing discolouration zone is a zone of partial devitrification, and it does seem to have a positive effect on the strength of the end product. One of the primary aims of the manufacturing process disclosed herein is to optimise the heat treatment cycle in order to optimise the aesthetically pleasing discolouration zone for both aesthetic and strength benefits.

Section C is the cooling of the product. The time rate of temperature change is restricted by the difference in thermal expansion of the glass material and the container. This depends on the material composition of the container and the thermal properties of the kiln.

Heat extracted at this part of the process may be utilised elsewhere in the process.

Annealing is undertaken in Section D. This is a process understood by those practiced in the art The annealing temperature is more than the transition temperature, $T_g$ for soda-lime glass, typically above 500° C. Annealing time is determined by the size of the vitrified glass cullet and other properties of the product, such as thickness.

The annealing is controlled by controlling the cooling rate of the kiln—i.e. a little additional heat/energy may be applied and natural cooling is slowed to maintain the annealing temperature range for the desired period.

The temperature must be kept in the annealing range of the panel and Panel material for the required duration. Annealing temperature for the panel material is between about 500° C. to about 750° C., preferably 500° C. to 650° C. and in a preferred embodiment it is 520° C. to 560° C. For a 20 mm thick panel, the annealing time may be between 90 and 120 minutes. Ideally annealing should be as long as is economically practical.

In general, the duration of annealing is depended on the mass of the panel, its thickness, and its heat dissipation rate (that is subject to the cooling effects of the embedded wire mesh if present).

Larger products consisting of large cullet require longer annealing times.

Larger products (eg large panels) require longer annealing times.

The duration of the annealing is strongly dependent on the size of the remaining vitrified cullet embedded in the blended and slumped product. Small amounts of remaining glass provide for shorter annealing times.

Section E represents the cooling and removal of the panel from the kiln.

After soaking, the panel and containment vessel material is allowed to cool down at a rate that is determined by the overall energy efficiency/usage of the kiln, and the time-rate limit determined by the differential thermal expansion of the panel and the containment vessel.

Typically this can be done as natural cooling and heat exchanging within the process and kiln.

FIGS. 1A and 1B show a conceptual view of the panel manufacturing process disclosed herein. The processes 100 and 150 as shown respectively in FIGS. 1A and 1B are similar in terms of the process for the decorative panel and the Industrial Panel respectively, with the only significant difference in the overall system being in the storage sources from where the feedstock mixtures are derived. For the decorative panel, the feedstock mixtures are largely derived from cullet storage 110a comprising sorted cullet sources e.g. sorted by size and/or colour. For the industrial panel process shown in FIG. 1B the product is formed primarily from glass fines feedstock from fines storage 110b. Prior to forming a desired mixture for a decorative panel of a desired appearance is mixed 115 from the available storage sources 101, the cullet is further sorted 111 and screened 113. Similarly for the Industrial Panel, the glass fines are further sorted to obtain fines of an appropriate size and screened prior to the mixing stage 115 to obtain the feedstock mixture. Once a suitable mixture has been obtained the mixture is loaded 117 into a container mould (sourced from mould storage 116) or containment system. Steel reinforcing mesh (sourced from mesh storage 118) is also loaded into the container or containment system in this step along with any veneer particle layers (stored in storage locations 119) as desired.

When the container or containment system is loaded to required specifications, the container is presented by suitable means to an appropriate kiln 120 for heat treatment. The heat treatment or firing process within the kiln is delineated into at least 5 distinct zones or time periods:

Section A—Initial Heating 101;
Section B—Soaking 102;
Section C—Intermediate Cooling 103;
Section D—Annealing 104; and
Section E—Final Cooling 105.

FIG. 2A shows a stylised representation of a container 201 for use in the processes disclosed herein. Mixture 210 comprising glass fragments and metal reinforcing is loaded into container 210 in accordance with requirements for the particular panel type to be manufactured. It is important that each layer of mixture 201 be uniform in its density and composition, and layered fully to the edge of the containment vessel/system 201. An additional special loading and forming technique is preferred to ensure that there is no edge slump in the mound. This requires approximately a 10% increase in the amount of mixture 201 at the edges 211 of container 201. The additional mixture is loaded in the edge ~10% of the containment vessel/system 201 as is shown in FIG. 2A.

This 10% additional loading of the mixture in the 10% region from the edges of container 201 can be achieved with a mixture distribution tool 220 as shown in FIG. 2A. Mixture distribution tool 220 is applied to the laden containment vessel/system 201 to push mixture material 210 from the centre of container 201 to the edges 211 to obtain a mixture distribution similar to that seen in FIG. 2B. The finished product 230 after slumping of mixture 210 due to the heat treatment process disclosed herein is seen whilst still within container 201 in FIG. 2C showing the zones 203 o forming aesthetically pleasing discolouration zones in the final product.

Figure 3A:
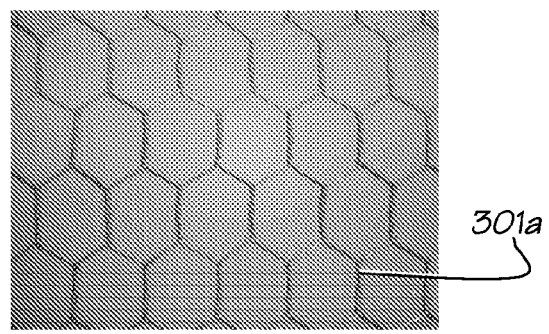
FIGS. 3A, 3B, and 3C show some of the types and styles of reinforcing mesh available for use as reinforcing layers in the products disclosed herein.
Figure 3B:
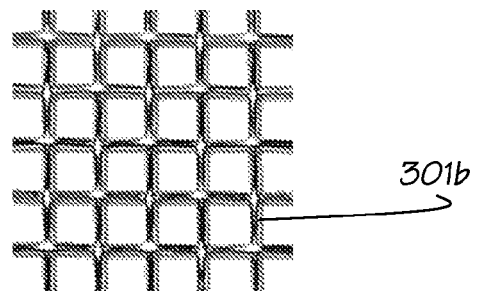
Figure 3C:
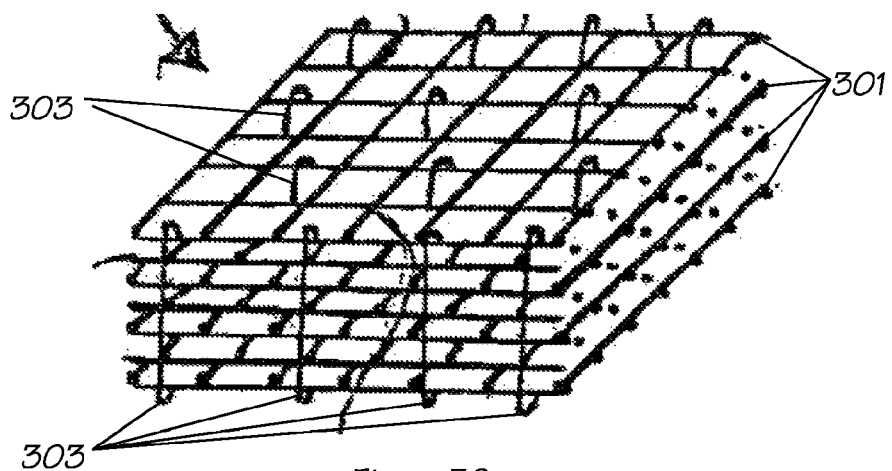

FIGS. 3A, 3B and 3C respectively show examples of a 2-dimensional woven steel mesh 301a, a 2-dimensional welded steel mesh 301b and a 3-dimensional steel mesh formed by multiple layers of a 2-dimensional steel reinforcement mesh 301 each interconnected by lateral (z-axis) reinforcement such as wire stirrups 303.

Heating Process

The heating process for forming the architectural or building products disclosed herein is largely similar for the different panel types envisaged herein, with differences primarily being in the maximum temperature to which the mixture is heated and the time period which the mixture is either held at a particular soaking or annealing temperature and/or the time periods in which the mixture is heated or cooled to a specified temperature within the process.

The Heating process is summarised in the graph of FIG. 4 and comprises:

Section A 101—Initial Heating of the mixture over a first time period $t_1$ which is as rapidly as the process allows to a first temperature $T_1$ intermediate the glass transition point temperature $T_g$ and a maximum temperature $T_{max}$, where $T_{max}$ is selected based on the particular type of panel to be manufactured;

Section B 103—Soaking the mixture at temperature $T_1$ between about 800-950° C. for a second time period, $t_2$, from 10 minutes to several hours, depending on the product thickness and mass of glass and in some cases mesh to be soaked. There is no upper limit to soak time, it is essentially a cost factor in processing;

Section C 105—Cooling the mixture over a third time period, $t_3$, as quickly as the kiln/process allows to a second temperature $T_2$ between about 500° C. to about 750° C., preferably 500° C. to 650° C. and in a preferred embodiment it is 520° C. to 560° C.;

Section D 107—Annealing the mixture at second temperature $T_2$ between about 500° C. to about 750° C., preferably 500° C. to 650° C. and in a preferred embodiment it is 520° C. to 560° C. over a fourth time period, $t_4$, for 30 minutes to several hours depending on the product thickness and mass of glass and in some cases mesh. There is no upper limit on annealing time, it is essentially a cost factor in processing; and Section E 109—Final Cooling of the mixture over a fifth time period, $t_5$, takes place as quickly as the kiln/process allows to form product.

For the "stone" Panel described herein, $T_{max}$, is approximately 950° C. For the "glass" Panel described herein, $T_{max}$, is approximately 1,100° C.

EXAMPLES

We present here seven examples of panels made using processes disclosed above. They include:
1. Soda-lime glass Decorative Panel from coarse recycled cullet without mesh reinforcement.
2. Soda-lime glass Industrial Panel from 'fines' recycled cullet without mesh reinforcement.
3. Soda-lime glass Decorative Panel from coarse recycled cullet with mesh reinforcement.
4. Soda-lime glass Thick Decorative Panel from coarse recycled cullet with two mesh reinforcements.
5. Soda-lime glass Industrial Panel from fines recycled cullet with mesh reinforcement.
6. Soda-lime glass Decorative Panel and/or Industrial Panel from Fines or Coarse Recycled Cullet with Multiple Mesh Reinforcement.
7. Soda-lime Glass Decorative Panel and/or Industrial Panel from a Combination of Recycles Cullet larger than 8 mm, and Fines of about 3 mm, With or Without, One or More Layers of Mesh Reinforcement.

Example 1: Soda-Lime Glass Decorative Panel from Coarse Recycled Cullet With-Out Mesh Reinforcement Loading The Container Mixed soda-lime glass cullet of size 10 to 25 mm and one specific colour (clear soda-lime bottles) is loaded into a containment vessel/system made from fire brick material. Release paper is added to the containment vessel/system prior to loading to assist in removal of the finished panel from the containment vessel. Loading of the vessel is undertaken according to weight (mass) of the glass cullet feedstock. The density of soda-lime glass—the most common and cheapest—is about 2.5 t/m³ (2.5 g/cc). When completed, the panel is solid with no included air, and therefore each millimetre of panel thickness requires 2.5 kg of cullet per square metre per millimetre thickness. The required panel thickness here is 25 mm therefore the loading weight is about 2.5×25=75 kg.

The total amount of cullet and the number of mesh layers is determined by the requirements of the end product—and measured by the weight of material per square metre.

For many embodiments of the process it is important that each layer be uniform in its density and composition, and layered fully to the edge of the containment vessel/system. An additional special loading and forming technique is preferred to ensure that there is no edge slump in the mound. This requires approximately a 10% increase in the amount of cullet in the edge ~10% of the containment vessel/system as is shown in FIG. 2B.

This 10% by 10% enhancement can be achieved with distribution tool 220 as shown in FIG. 2A—it is applied to the laden containment vessel/system 201 to push mixture material 210 from the centre to the edges 211.

Firing Curve

The loaded containment vessel is heated in the kiln according to the heating process disclosed above as follows:

Section A is the heating of the containment vessel and the glass cullet. This is undertaken as quickly—and as efficiency—as can be done. The temperature is ramped to about 850° C. Some volatile material is/may be burned off in this process. Clean air requirements are followed for flue gases.

Section B is the soaking part of the firing curve. Here the temperature is held constant at 850° C. for 30 minutes for a small panel (300 mm×300 mm×25 mm), and at higher temperature and for longer for larger masses and dimensions. Temperature control is imperative and the temperature must not vary by more than +/−5° C. It is also imperative that the temperature be uniform over the length and breadth of the containment vessel/system.

Changes in temperature and soaking times modify the amount of the aesthetically pleasing discolouration zone and hence the strength of the material and its aesthetics.

The temperature range in this section allows the viscosity of the vitrified glass cullet to fall so that gravitational slumping occurs allowing the lamination of the deformed cullet to proceed.

Section C is the cooling of the panel material and the containment vessel. The time rate of temperature change is restricted by the difference in thermal expansion of the glass material and the vessel. This depends on the material of the vessel. Heat extracted at this part of the process is utilised elsewhere in the process.

Annealing is undertaken in Section D. The temperature must be kept in the annealing range of the panel material for the required duration. Annealing temperature for the panel material is between about 500° C. to about 750° C., preferably 500° C. to 650° C. and in a preferred embodiment it is 520° C. to 560° C. and the duration is 90 mins.

Standard processes are available for the annealing of glass products.

In general, the duration time is depended on the mass of the panel, its thickness, and its heat dissipation rate (that is subject to the cooling effects of the embedded wire matrix if that is embedded). Annealing time is also determined by the size of the vitrified glass cullet remaining and other properties of the panel.

Products consisting of large cullet pieces require longer annealing times. Larger products (e.g. large panels) require longer annealing times. Ideally annealing should be as long as is economically practical. The annealing is undertaken by controlling the cooling rate of the kiln—i.e. no additional heat/energy is applied and natural cooling is slowed to maintain the annealing temperature range for the desired period.

Section E represents the cooling and removal of the panel from the kiln. This is again determined by the thermal expansion nature of the panel and the containment vessel. Typically, this can be done as natural cooling and heat exchange within the process, and at a rate that is determined by the overall energy efficiency/usage of the kiln, and the time-rate limit determined by the differential thermal expansion of the panel and the containment vessel.

Panel Finishing

After cooling, the panel material is removed from the containment vessel and cut to size and corner work undertaken with a diamond tipped saw or with water jet technology.

The bottom of the panel can be trimmed, ground and polished using usual cutting and polishing procedures and equipment as would be appreciated by the skilled addressee to create a 'glass-like' appearance. All sides of the panel may be cut to the desired surface or shape. Other surface modifications can be undertaken (including slumping in the containment vessel to imprint a logo/s on the surface of the panel). The surface can be etched or coated with a special paint, clays or rubbers etc. Holes can be drilled through the panel for mounting purposes etc. All trimming and processing waste can be re-used in this process.

Example 2: Soda-Lime Glass Industrial Panel from 'Fines' Recycled Cullet With-Out Mesh Reinforcement Loading The Container Mixed soda-lime glass 'fines' cullet of size less than or equal to 3 mm are a mixture of many colours (resulting from the sweepings of cullet storage bins) were loaded into a containment vessel made from fire brick material. Release paper is added to the containment vessel/system prior to loading.

As in the Example 1, loading is undertaken via weight (mass) where each millimetre of panel thickness requires 2.5 kg of cullet per square metre per millimetre thickness.

Containment vessel loading for the Industrial Panel-type product is just with the 3 mm 'fines'. The total amount of cullet is determined by the requirements of the end product—and measured by the weight of material per cubic metre.

Again it is important that each layer be uniform in its density and composition, and layered fully to the edge of the containment vessel. An additional special loading and forming technique is preferred to ensure that there is no edge slump in the mound. This requires a 10% increase in the amount of cullet in the edge 10% of the vessel as is shown in the attached drawing, FIGS. 2A and 2B as described above.

Firing Curve

As above (i.e. in Example 1) the Panel was fired in a kiln according the above schedule with the exception in the present example that in Section B, the soaking time is 100 minutes.

Annealing in the present Example is the same as per the annealing stage described in Example 1 above.

Panel Finishing

Panel finishing in the present Example is the same as described in Example 1.

Unlike the decorative panel, the Industrial Panel has a rough surface that is not easily removed, but can be used to advantage in non-slip locations.

Example 3: Soda-Lime Glass Decorative Panel from Coarse Recycled Cullet with Mesh Reinforcement Loading the Container Mixed soda-lime glass cullet of size 8 to 25 mm and one specific colour (clear soda-lime bottles) was loaded into a containment vessel made from fire brick material. Release paper is added to the containment vessel prior to loading. A single layer of wire mesh was added as reinforcement.

As for Examples 1 & 2, loading is undertaken by weight (mass) measurement.

Containment vessel loading for the Decorative Panel with the wire mesh was done in layers. First there was a layer of 25 mm cullet, then a layer 12 mm cullet. The wire mesh was next embedded in 8 mm of 8 mm cullet. The containment vessel was then filled with a layer of 12 mm, and then a layer of 25 mm cullet.

The mesh used was a welded square mild-steel mesh with 25 mm spacing and 2.5 mm wire thickness. The mesh could be stainless steel for high-value-added architectural panels where durability is more important than price. Mild steel was used here as it is appropriate for ordinary applications where price is paramount.

For panel with a single layer of wire mesh the procedure is:

First there is a layer of 25 mm cullet.
Then a layer 12 mm cullet.
The layer of wire mesh is next embedded in 8 mm of 8 mm cullet.
A layer of 12 mm cullet is added.
Then a final layer of 25 mm cullet is added.

Again it is important that each layer be uniform in its density and composition, and layered fully to the edge of the containment vessel/system. The additional special loading and forming technique is preferred to ensure that there is no edge slump in the vessel, as in Example 1.

Firing Curve

As above, per Examples 1 and 2, the panel was fired in a kiln according the above schedule, with the soaking time of 40 minutes, Annealing was at 550° C. for 100 minutes.

Panel Finishing

Panel finishing is as described in Example 1, with the exception that attention is paid to the metal edges of the panel which were cut to the desired shape, treated for rust/corrosion prevention and covered for safety reasons.

Example 4: Soda-Lime Glass Thick Decorative Panel From Coarse Recycled Cullet with Two Mesh Reinforcements Loading The Container Mixed soda-lime glass cullet of size 8 to 25 mm and one specific colour (clear soda-lime bottles) was loaded into a containment vessel made from fired brick material. Release paper is added to the vessel prior to loading. Two pieces of wire mesh were embedded into the glass cullet as below.

Again, loading is undertaken via weight (mass) with each millimetre of panel thickness requires 2.5 kg of cullet per square metre per millimetre thickness.

The mesh used for the Decorative Panel with two wire mesh reinforcements was the welded mild steel square mesh with 25 mm spacing and 2.5 mm wire thickness.

Containment vessel loading for the Decorative Panel with two wire mesh is done in multiple layers. For panel with multiple layers of wire mesh the procedure for loading the container in the present example is:

First there is a layer of 25 mm cullet.
Then a layer 12 mm cullet.
The first layer of wire mesh is next embedded in 8 mm of 8 mm cullet.
A layer of 12 mm cullet is added.
The second wire mesh is again embedded in another 8 mm of 8 mm cullet.
Then another layer of 12 mm cullet is added
Then a top up layer of 25 mm cullet is added.

Again it is important that each layer be uniform in its density and composition, and layered fully to the edge of the vessel.

Firing Curve

As for Example 1—the panel was fired in a kiln according the above schedule, with the soaking time of 120 minutes.

The annealing temperature was 550° C. for 120 minutes

Panel Finishing

Panel finishing is as described in Example 3 above.

Example 5: Soda-Lime Glass Industrial Panel From Fines Recycled Cullet with Mesh Reinforcement Loading the Container:

Mixed soda-lime glass 'fines' of approximately 3 mm and of different colours was loaded into the containment vessel. Release paper was again added to the containment vessel prior to loading. A single layer of wire mesh was embedded into the glass cullet. As above, loading is undertaken via weight.

The mesh used for the Industrial Panel reinforcement was the mild steel welded square mesh with 25 mm spacing and 2.5 mm wire thickness. Containment vessel loading for the Industrial Panel with the wire mesh is done on three layers. The fines were evenly distributed over the containment vessel/system to the desired thickness of 15 mm then the wire mesh was added, and another 15 mm of fines places on top of the mesh.

Again it was important that each layer be uniform in its density and composition, and layered fully to the edge of the containment vessel/system.

Firing Curve

As above—Example 2—the panel was fired in a kiln according the above schedule, with the soaking time of 100 minutes. Annealing as for Example 2.

Panel Finishing

Panel finishing is as described in Example 3 above.

Example 6: Soda-Lime Glass Industrial Panel or Panel Made from Fines or Coarse Recycled Cullet with Multiple Mesh Reinforcement Following from above Examples 3, 4 and 5, and especially Example 4, both the Decorative panel and the Panel can be made with multiple (more than two) layers of mesh embedded.

The loading procedure in the Example 4 is repeated for each additional layer of mesh. The total amount of cullet is determined by the requirements of the end product—and measured by the weight of material per square metre.

Example 7: Soda-Lime Glass Decorative Panel and/or Industrial Panel from a Combination of Recycles Cullet larger than 8 mm, and Fines of about 3 mm, With or Without, One or More Layers of Mesh Reinforcement Following from above Examples both the Decorative Panel and the Industrial Panel can be made with multiple (more than two) layers of mesh embedded, and from a combination of cullet and fines.

The loading procedure is an extension of Example 6 above.

Interpretation

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each Claim. Rather, as the following Claims reflect, inventive aspects lie in less than all features of a single foregoing disclosed embodiment. Thus, the Claims following the Detailed Description of Specific Embodiments are hereby expressly incorporated into this Detailed Description of Specific Embodiments, with each Claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following Claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including.

In the Claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention.

The processing methods and processes disclosed herein, and the products formed by such processes provide a number of significant advantages over current methods for processing recycled glass, including:
 a plurality of environmentally friendly commercial products from an abundant worthless waste product,
 the perfect temperature for the visually pleasing white regions of the finished product to form,
 the low heat energy involved compared to conventional glass and ceramics, and
 the use of steel mesh to make the finished products viable to produce large panels of high impact strength.

Thus, while there has been described what are believed to be the preferred embodiments of the invention, those skilled in the art will recognize that other and further modifications may be made thereto without departing from the spirit of the invention, and it is intended to Claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the building and construction industries and to civil engineering applications.

The invention claimed is:

1. A process for forming a glass product, the process comprising:
 providing a containment system;
 locating a mixture in said containment system, said mixture comprising glass fragments and locating at least one layer of reinforcement, adapted to mechanically interlock with said mixture when heated; and
 applying at least one heating process and at least one cooling process to said mixture, wherein the at least one heating process comprises a first heating process of heating the one or more materials to a soaking temperature being a temperature between the glass transition point temperature and 1100° C. such that said glass fragments slump to form the product;
 wherein said mixture comprises at least two cullet types being a first cullet type and a second cullet type, and wherein said at least two cullet types are different size categories or different colours;
 wherein said locating of said mixture in said containment system comprises locating at least a first layer of cullet of said first cullet type and a second layer of cullet of said second cullet type; and
 wherein a layer of said at least one layer of reinforcement is disposed intermediate said first layer and said second layer.

2. The process according to claim 1, wherein the soaking temperature is a temperature between the glass transition point temperature and 950° C.

3. The process for forming a product as claimed in claim 1, wherein said mixture further comprises contaminants, and any volatiles in said contaminants are released and the remainder of said contaminants form portions of the product.

4. The process for forming a product as claimed in claim 1, wherein said mixture comprises additives for enhancing slip resistance, colour, and texture used in tiles and architectural panels.

5. The process for forming a product as claimed claim 1, wherein the product is panel-like and said locating said mixture in said container comprises at least locating one layer of said mixture in said containment system.

6. The process for forming a product as claimed claim 1, further comprising a step of lining said containment system with a release liner prior to said locating said mixture in said container.

7. The process for forming a product as claimed in claim 3, wherein said contaminants comprise less than or equal to about 25% of the mass of said mixture.

8. The process for forming a product as claimed in claim 4, wherein said additives are selected to change a physical property or a chemical property of said product.

9. The process for forming a product as claimed in claim 4, wherein said additives are selected to change an aesthetic property of said product.

10. The process for forming a product as claimed in claim 9, wherein said aesthetic property is at least one of:
colour;
non-flat products such as dishes, flowerpots and the like and other non-flat products;
an internal texture of said product; and
a surface texture enhancement of said product, said surface texture enhancement being selected from one or more of non-slip or abrasive texturing; or a translucency of said product.

11. The process for forming a product as claimed in claim 10, wherein said additive comprises one or more of abrasive grit, corundum, carborundum, garnet or the like.

12. The process for forming a product as claimed in claim 8, wherein said property is at least one of:
a range of mounting/attachment options, such as moulded handles and the drilling of holes and gluing;
a range of chemical resistivity properties, particularly to acids, organic solvents and oils and greases; and
a range of electrical conductivity and dielectric properties; or a textured surface of embossed patterns.

13. The process for forming a product as claimed in claim 1, wherein said at least one heating process is carried out in a kiln.

14. The process for forming a product as claimed in claim 4, wherein said mixture in said containment system comprises two or more layers of cullet.

15. The process for forming a product as claimed in claim 14, wherein a maximum particle size of the glass fragments used in each layer is limited by a thickness of the layers.

16. The process for forming a product as claimed in claim 1, further comprising the steps of:
maintaining said soaking temperature for a first selected period of time;
cooling said mixture to an annealing temperature; and
maintaining the annealing temperature for a second selected period of time to form said product.

17. The process for forming a product as claimed in claim 1, further comprising the step of compressing said mixture in said containment vessel at said soaking temperature.

18. The process for forming a product as claimed in claim 1, wherein said mixture comprises soda-lime glass and said glass transition point temperature comprises about 500° C. or greater.

19. The process for forming a product as claimed in claim 1, wherein said mixture comprises soda-lime glass and wherein the working glass viscosity point temperature is about 1,100° C.

20. The process for forming a product as claimed in claim 1, wherein said mixture comprises soda-lime glass and said soaking temperature is between about 800 and 950° C.

21. The process for forming a product as claimed in claim 1, wherein said mixture comprises soda-lime glass and said soaking temperature is between about 875 +/−25° C.

22. The process for forming a product as claimed in claim 1, wherein said mixture comprises soda-lime glass and said annealing temperature is between about 500° C. and about 750° C.

23. The process for forming a product as claimed in claim 1, wherein said mixture comprises soda-lime glass and said annealing temperature is between 500° C. and 650° C.

24. The process for forming a product as claimed in claim 1, wherein said mixture comprises soda-lime glass and said annealing temperature is between 520° C. and 560° C.

25. A process for forming a glass-ceramic product, the process comprising:
providing a containment system;
locating a mixture in said containment system, wherein said step of locating said mixture in said containment system comprises the step of locating at least one layer of reinforcement, adapted to mechanically interlock with said mixture when heated;
said mixture substantially comprising glass fragments of a size greater than about 3 mm;
applying at least one heating process and at least one cooling process to said mixture, wherein the at least one heating process comprises a first heating process of heating said mixture to a soaking temperature being a temperature between 800° C. and 880° C. such that said glass fragments slump to form the product and so as to form at least one zone of partial devitrification of the product;
wherein said mixture comprises at least two cullet types being a first cullet type and a second cullet type, and wherein said at least two cullet types are different size categories or different colours;
wherein said locating of said mixture in said containment system comprises locating at least a first layer of cullet of said first cullet type and a second layer of cullet of said second cullet type; and
wherein a layer of said at least one layer of reinforcement is disposed intermediate said first layer and said second layer.

26. The process for forming a glass-ceramic product as claimed in claim 25, wherein the soaking temperature is a temperature of 850° C.±25° C.

27. The process for forming a glass-ceramic product as claimed in claim 25, wherein said at least one layer of reinforcement comprises a metal reinforcement member.

28. The process for forming a glass-ceramic product as claimed in claim 27, wherein said metal reinforcement member comprises a mesh of a shape adapted to enhance the strength of said product.

29. The process for forming a glass-ceramic product as claimed in claim 28, wherein said mesh is formed from steel wire, mild steel or stainless steel; and/or wherein said mesh comprises a welded rectangular wire mesh comprising wires having:
a spacing of between about 5 mm and 100 mm, and
a wire thickness of between about 0.1 mm and 6 mm; or
wherein said mesh comprises a welded square wire mesh comprising wires having:
a spacing of about 25 mm spacing, and
a wire thickness of between about 2 to 3 mm.

30. The process for forming a glass-ceramic product as claimed in claim 25, wherein an attachment is slump moulded into the product.

31. The process for forming a glass-ceramic product as claimed in claim 28, wherein the mesh comprises either galvanised or zinc-coated metal; and/or wherein the mesh comprises either a welded or woven metal mesh; and/or wherein said mesh is formed from a material having a thermal coefficient of expansion that is greater than that of said product.

32. The process for forming a glass-ceramic product as claimed in claim 28, wherein said at least one layer of reinforcement comprises at least three layers of mesh and wherein said at least three layers of mesh are interconnected via z-pinning.

33. The process for forming a glass-ceramic product as claimed in claim 25, further comprising the step of: locating additives in the containment system prior to, or during, the heating of said mixture.

34. The process for forming a glass-ceramic product as claimed in claim 33, wherein said mixture comprises additives for enhancing at least one of: slip resistance, colour, texture, and translucency.

35. The process for forming a glass-ceramic product as claimed in claim 33, wherein said additive comprises one or more of abrasive grit, corundum, carborundum, garnet or the like.

36. The process for forming a glass-ceramic product as claimed in claim 33, wherein said additives are selected to change a physical property and/or a chemical property of said product; and wherein said physical property and/or a chemical property is at least one of: chemical resistivity properties, electrical conductivity properties, and dielectric properties.

37. The process for forming a glass-ceramic product as claimed in claim 25, wherein said mixture comprises substantially of soda-lime glass.

38. The process for forming a glass-ceramic product as claimed in claim 25, wherein said glass fragments are mixed soda-lime glass cullet of size 8 to 25 mm and one specific colour.

* * * * *